(12) United States Patent
Moriya et al.

(10) Patent No.: US 12,373,247 B2
(45) Date of Patent: Jul. 29, 2025

(54) INFORMATION PROCESSING SYSTEM, INFORMATION PROCESSING METHOD, AND PROGRAM

(71) Applicant: SONY GROUP CORPORATION, Tokyo (JP)

(72) Inventors: Hiroki Moriya, Tokyo (JP); Keitaro Machida, Tokyo (JP); Itaru Shimizu, Tokyo (JP); Kenta Kawamoto, Tokyo (JP); Suguru Aoki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 541 days.

(21) Appl. No.: 17/777,206

(22) PCT Filed: Dec. 10, 2020

(86) PCT No.: PCT/JP2020/046000
§ 371 (c)(1),
(2) Date: May 16, 2022

(87) PCT Pub. No.: WO2021/131739
PCT Pub. Date: Jul. 1, 2021

(65) Prior Publication Data
US 2022/0391246 A1 Dec. 8, 2022

(30) Foreign Application Priority Data

Dec. 24, 2019 (JP) .................. 2019-232392

(51) Int. Cl.
*G06F 9/48* (2006.01)
(52) U.S. Cl.
CPC ................. *G06F 9/4881* (2013.01)

(58) Field of Classification Search
CPC .............. G06F 9/4881; G06Q 10/10
See application file for complete search history.

(56) References Cited

U.S. PATENT DOCUMENTS

| 2017/0352162 | A1* | 12/2017 | Ruan | G06T 7/60 |
| 2018/0218075 | A1* | 8/2018 | James | G06F 7/24 |
| 2020/0357406 | A1* | 11/2020 | York | G10L 25/78 |

FOREIGN PATENT DOCUMENTS

| JP | 09-006619 A | 1/1997 |
| JP | 2001-188787 A | 7/2001 |
| JP | 2006127350 A | 5/2006 |
| JP | 2013-165780 A | 8/2013 |
| JP | 2019-036087 A | 3/2019 |

OTHER PUBLICATIONS

International Search Report issued Mar. 9, 2021 in PCT/JP2020/046000 filed on Dec. 10, 2020, 2 pages.

* cited by examiner

*Primary Examiner* — Sisley N Kim
(74) *Attorney, Agent, or Firm* — Oblon, McClelland, Maier & Neustadt, L.L.P.

(57) ABSTRACT

The present disclosure relates to an information processing system, an information processing method, and a program that enable task processing to be implemented by creative and highly flexible processing.
A task is processed on the basis of information regarding the task, and the task is further processed on the basis of information having low relevance to the task on the basis of the evaluation of the processing result. The present disclosure can be applied to a task processing apparatus.

18 Claims, 11 Drawing Sheets

INFORMATION PROCESSING SYSTEM, INFORMATION PROCESSING METHOD, AND PROGRAM

TECHNICAL FIELD

The present disclosure relates to an information processing system, an information processing method, and a program, and more particularly, relates to an information processing system, an information processing method, and a program that can implement creative and highly flexible task processing.

BACKGROUND ART

A technology for presenting processing of a task using machine learning is becoming widespread.

The technology for presenting processing of a task is required to not only present uniform general processing but also present creative and highly flexible processing.

Therefore, for example, regarding processing of a task, a technology of compiling success cases and failure cases into a database, comparing both the success cases and the failure cases, and presenting information that becomes a difference has been proposed (see Patent Document 1).

Furthermore, as task processing related to diagnosis, a technology of presenting both a diagnosis name that is an inference result based on user information and a diagnosis name that is a negative result regarding the inference result has been proposed (see Patent Document 2).

Either case can be used as a hint in considering creative and highly flexible task processing.

CITATION LIST

Patent Document

Patent Document 1: Japanese Patent Application Laid-Open No. 9-6619
Patent Document 2: Japanese Patent Application Laid-Open No. 2013-165780

SUMMARY OF THE INVENTION

Problems to be Solved by the Invention

However, both Patent Documents 1 and 2 can be a hint in considering creative and highly flexible task processing, but they do not implement practical processing.

The present disclosure has been made in view of such a situation, and in particular, implements creative and highly flexible task processing.

Solutions to Problems

An information processing system and a program according to one aspect of the present disclosure are an information processing system that includes a task processing unit that processes a recognized task on the basis of first information having higher relevance to the task than a predetermined standard and second information having lower relevance to the task than the predetermined standard, and a program.

An information processing method according to one aspect of the present disclosure is an information processing method that includes a step of processing a recognized task on the basis of first information having higher relevance to the task than a predetermined standard and second information having lower relevance to the task than the predetermined standard.

In one aspect of the present disclosure, the task is processed on the basis of first information having higher relevance to the recognized task than a predetermined standard and second information having lower relevance to the task than the predetermined standard.

MODE FOR CARRYING OUT THE INVENTION

Preferred embodiments of the present disclosure will be described below in detail with reference to the accompanying drawings. Note that in the present description and drawings, configuration elements having substantially the same functional configuration are given the same reference signs, and thus redundant description thereof will be omitted.

Modes for carrying out the present technology will be described below. The description will be given in the following order.

1. First Embodiment
2. Modification of First Embodiment
3. Second Embodiment
4. Third Embodiment
5. Example of Causing Software to Execute

1. First Embodiment

<Configuration Example of Information Processing Apparatus of Present Disclosure>

The present disclosure is to propose and to make it possible to achieve creative and highly flexible task processing as processing for solving a task. Here, "being creative" means, for example, to perform problem solving by using information having a distant relevance to a task (information that is low in relevance to the task).

First, a configuration example of hardware of the information processing apparatus of the present disclosure will be described with reference to the block diagram of FIG. 1.

Figure 1:
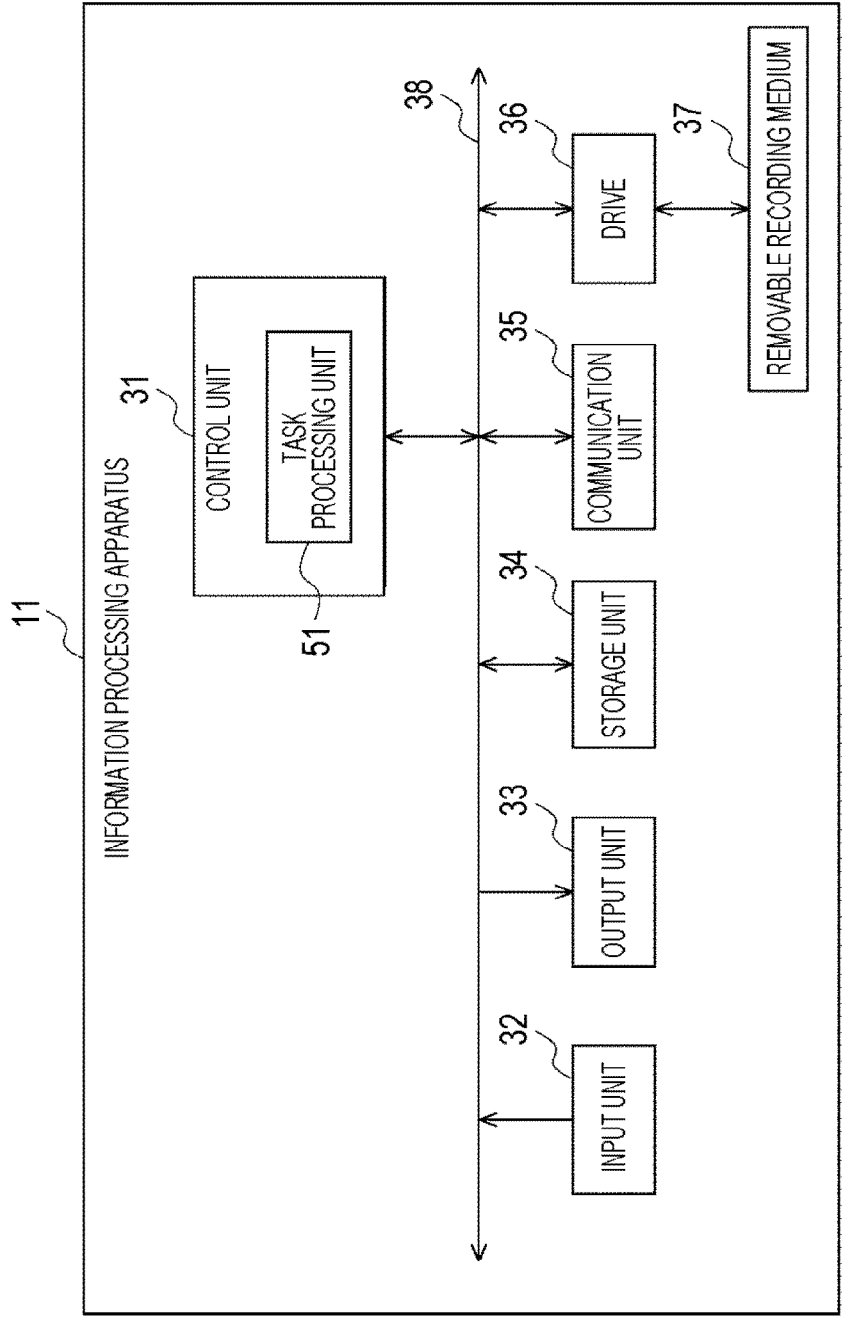
FIG. 1 is a diagram illustrating a configuration example of hardware of an information processing apparatus of the present disclosure.

An information processing apparatus 11 of FIG. 1 is, for example, a personal computer or the like, and solves various tasks by constituting a part of a system for processing various tasks, processing various tasks, and outputting them as processing results.

The task may be, for example, object grasping (picking) by a robot, and in this case, the information processing apparatus 11 achieves a robot having a manipulator that performs object grasping such as component grasping in a factory or user assistance at home, or a system that controls the manipulator.

Furthermore, the task may be, for example, a route search (path planning), and in this case, the information processing apparatus 11 achieves a system that presents a route from a start point to a goal point that are set. The route search is used, for example, to give an instruction on a route to a moving body such as an automobile or to prepare an action plan of the moving body itself.

Moreover, the task may be, for example, recipe generation for cooking or the like, and in this case, the information processing apparatus 11 achieves a system that generates and outputs a cooking recipe. The recipe is, for example, a procedure for processing and editing by combining ingredients and materials, and may be a machining procedure or a research procedure in addition to cooking.

Furthermore, the task may be, for example, automatic generation of speech in a system that communicates with the user, and in this case, the information processing apparatus 11 achieves, for example, a system that performs speech-based system operation by a financial institution and the like, a service guide in a shop, and a chat in a nursing facility or a home.

Moreover, the task may be support of decision making of the user, and in this case, the information processing apparatus 11 achieves a system that generates and presents a candidate action option, recommends the option to a user with a priority corresponding to the option, and performs navigation regarding an action or business action support.

Thus, the task may vary widely, and is not limited to the above-described types of tasks.

The information processing apparatus 11 of FIG. 1 includes a control unit 31, an input unit 32, an output unit 33, a storage unit 34, a communication unit 35, a drive 36, and a removable storage medium 37, which are connected to one another via a bus 38, and can transmit and receive data and programs.

The control unit 31 includes a processor and a memory, and controls the entire operation of the information processing apparatus 11.

Furthermore, the control unit 31 includes a task processing unit 51.

The task processing unit 51 recognizes a task that needs to be processed, on the basis of information input via the input unit 32, implements processing (hereinafter, also referred to as task processing) for solving the recognized task, and outputs a processing result from the output unit 33.

Note that a detailed configuration of the task processing unit 51 will be described later with reference to FIG. 2.

The input unit 32 includes an input device such as a keyboard with which the user inputs an operation command and a microphone with which the user inputs an operation command by voice, and various sensors such as a camera, a distance measuring sensor, a temperature sensor, a humidity sensor, an illuminance sensor, and a biological sensor. The input unit 32 supplies input or detected various signals to the control unit 31.

Note that the sensor constituting the input unit 32 is not limited to the above-described sensors, and any sensor may be used as long as the sensor detects information required for the task.

The output unit 33 includes a voice output unit including a speaker and the like, and an image display unit including a liquid crystal display (LCD), an organic electro-luminescence (EL), and the like, and outputs various task processing results.

Note that the configuration of the output unit 33 only needs to be a configuration necessary for achieving the task, and is not limited to the voice output unit or the image display unit.

Furthermore, in a case where hardware necessary for implementing the processing of the task is separately present, the processing of the task is implemented by outputting a control signal for operating the hardware, and causing the hardware to operate.

At this time, connection with the hardware may be wired or wireless. Therefore, the hardware may execute an operation for implementing the processing of the task by the control signal by connecting a wired-connectable interface to the output unit 33 and supplying a control signal to the hardware via the interface where necessary.

Furthermore, the hardware may execute an operation for implementing the processing of the task by the control signal by supplying a control signal to the hardware by wired communication or wireless communication via the communication unit 35 described later, instead of the output unit 33.

The storage unit 34 includes a hard disk drive (HDD), a solid state drive (SSD), or a semiconductor memory, is controlled by the control unit 31, and writes or reads various data and programs.

Note that the storage unit 34 may be configured in a server on a network that can communicate via the communication unit 35 described later where necessary.

The communication unit 35 is controlled by the control unit 31, and transmits and receives various data and programs to and from various apparatuses via a communication network represented by a local area network (LAN) or the like in a wired (or wireless (not illustrated)) manner.

The drive 36 reads and writes data from and to the removable storage medium 37 such as a magnetic disk (including a flexible disk), an optical disk (including a compact disc-read only memory (CD-ROM) and a digital versatile disc (DVD)), a magneto-optical disk (including a mini disc (MD)), or a semiconductor memory.

Note that the present description explains an example in which the technology of the present disclosure is implemented by the information processing apparatus 11, but the technology of the present disclosure may be implemented by a system including a plurality of apparatuses.

That is, in the technology of the present disclosure, a plurality of personal computers and servers having the functions of the control unit 31, the input unit 32, the output unit 33, the storage unit 34, the drive 36, and the removable storage medium 37 included in the information processing apparatus 11, for example, may be configured on a network, or the technology of the present disclosure may be implemented by an information processing system having a configuration capable of communicating with each other by being configured by cloud computing.

<First Configuration Example of Task Processing Unit>

Next, a first configuration example of the function of the task processing unit 51 implemented by the control unit 31 will be described with reference to the functional block diagram of FIG. 2.

The task processing unit 51 includes a task input unit 71, a task processing module 72, a processing result evaluation module 73, an output unit 74, a bias value setting unit 75, an input data processing unit 76, and a storage module 77.

The task input unit 71 receives an input result and a detection result of the input unit 32 and comprehends the content of the task to be solved. The task input unit 71 performs input from a sensor, interpretation processing of input information, environment recognition processing, and the like where necessary, recognizes a predetermined task, and comprehends the content thereof. Here, "recognize" and "comprehend" a predetermined task means holding information on the predetermined task as a state that can be handled by the system by being applied to a data format, a pattern, or a model handled by the system on the basis of an input or detected signal.

Furthermore, the task input unit 71 outputs information regarding the content of the comprehended task to the task processing module 72 and the processing result evaluation module 73.

More specifically, for example, in a case of a task related to speech recognition, the task input unit 71 converts a voice input result from the user into text, performs semantic analysis, recognizes the text as "user's question content", and comprehends generation of speech according to the recognized "user's question content" as the content of the task.

At this time, the task input unit 71 may recognize the "user's question content" according to a context including, for example, information such as the user's position, time, and peripheral situation, in consideration of the user model, the user's action history, and the environment information where necessary.

Furthermore, for example, in a case of a task related to object grasping, the task input unit 71 three-dimensionally recognizes an external shape of the object on the basis of information of a camera, an ultrasonic sensor, and the like constituting the input unit 32, recognizes the external shape as "three-dimensional information of the grasping target", and comprehends grasping of the recognized object as the content of the task.

At this time, the task input unit 71 may estimate the gravity center position, the hardness of the object surface, and the like where necessary.

When the movement of the object is further required after the object is grasped, the task input unit 71 may acquire information such as the movement destination position and comprehend the information as the content of the task together with the grasping and the movement.

The task processing module 72 requests and acquires input data required for processing of the task from the input data processing unit 76, and applies the acquired input data to a specific processing pattern or processing model, thereby processing the task supplied from the task input unit 71, and outputting the processing result to the processing result evaluation module 73.

More specifically, for example, in the case of a task related to speech recognition, the task processing module 72 generates, as a processing result, an appropriate answer candidate for the "user's question content", which is the task, and outputs the generated answer candidate to the processing result evaluation module 73.

Furthermore, in the case of a task related to object grasping, the task processing module 72 generates, as a processing result, candidates of manipulator control information such as an object grasping position by a manipulator constituting the output unit 33 for example, torque, and approach of the manipulator up to grasping, and outputs the generated candidates to the processing result evaluation module 73.

Note that in the case of a task related to object grasping, the manipulator is the hardware required to implement processing of the task.

The input data processing unit 76 extracts, according to a bias value supplied from the bias value setting unit 75, information belonging to a first data group 91 and information belonging to a second data group 92 that are stored in the storage module 77, and supplies the extracted information to the task processing module 72.

Here, the information belonging to the first data group 91 is information related to a comprehended task, information having higher relevance to the comprehended task than a predetermined value, or information having a higher relationship to the comprehended task than that of the second data group 92.

For example, in the case of a task related to speech recognition, the information belonging to the first data group 91 is a term group or a speech sequence model related to the comprehended task. For example, when the speech has a content related to an operator agent of a financial institution, the information belonging to the first data group 91 is information such as a typical speech sequence model related to financial-related contents, service contents of a financial institution, or speech of an operator.

Furthermore, in the case of a task related to object grasping, the information belonging to the first data group 91 is information such as three-dimensional model information of a grasping target frequently appearing in a situation to be adapted in achieving the object grasping, surface information, gravity center information, a bias value optimized for the situation in environment recognition, and the like.

Moreover, the information belonging to the second data group 92 is information not related to the comprehended task, information having lower relevance to the comprehended task than a predetermined value, or information having a lower relationship to the comprehended task than that of the first data group 91.

For example, in the case of a task related to speech recognition, the information belonging to the second data group 92 is a term group or a speech sequence model not related to the comprehended task. For example, when the processing content of the task is an operator agent of a financial institution, the information belonging to the second data group 92 is information such as a word not related to the finance, a chat topic, a formulaic speech sequence model in the medical field, an atypical speech sequence model, or the like.

Furthermore, in the case of a task of object grasping, the information belonging to the second data group 92 is information used in a situation different from the situation to be applied in achieving the object grasping, or information irrelevant to the object grasping. For example, in a case of a task performed in an electronic component manufacturing factory, the information belonging to the second data group 92 is information such as information related to object grasping of a vehicle body carrying robot, a shape model and a hardness model of food, and travel information of a mobile robot.

The processing result evaluation module 73 evaluates, as an evaluation value, whether or not the candidate output information generated as a processing result by the task processing module 72 is information for appropriately solving the input task, and outputs the processing result to the output unit 74 when the evaluation result is higher than a predetermined threshold and the processing result can be regarded to appropriately solve the task.

Furthermore, when the evaluation result is lower than the predetermined threshold and the processing result can be regarded to fail to appropriately solve the task, the processing result evaluation module 73 outputs an evaluation value to the bias value setting unit 75.

More specifically, the processing result evaluation module 73 performs evaluation by obtaining an evaluation value of the processing result of the task on the basis of, for example, attainment prediction of the task, reward amount prediction in a reinforcement learning model, or the like.

More specifically, in the case of a task related to speech recognition, the processing result evaluation module 73 evaluates whether an appropriate reward amount can be obtained for a candidate answer that is a candidate output result in light of the user model and the question content.

Furthermore, in the case of a task related to object grasping, the processing result evaluation module 73 calculates and evaluates, as an evaluation value, a success probability of object grasping based on control that becomes a candidate for grasping an object that is a candidate output result.

The bias value setting unit 75 sets a bias value on the basis of the evaluation value that is an evaluation result supplied from the processing result evaluation module 73.

On the basis of the bias value, the input data processing unit 76 selectively extracts and supplies, to the task processing module 72, information belonging to the first data group 91 necessary for processing of the comprehended task stored in the storage module 77 and information belonging to the second data group 92.

In a case where the information necessary for the processing of the task is requested from the task processing module 72, the bias value is not supplied from the bias value setting unit 75 at the first time, and therefore the input data processing unit 76 extracts, by default, and supplies, to the task processing module 72, information belonging to the first data group 91 that is related to the task or high in relevance to the task.

Furthermore, in a case where the information necessary for the processing of the task is requested from the task processing module 72, at the second and subsequent times, according to the bias value from the bias value setting unit 75, the input data processing unit 76 extracts and supplies, to the task processing module 72, not only the information belonging to the first data group 91 that is related to the task or high in relevance to the task but also the information belonging to the second data group 92 that is not related to the task or low in relevance to the task.

The bias value is information (mixing ratio) that specifies at what proportion the information belonging to the first data group 91 and the information belonging to the second data group 92 that are supplied to the task processing module 72, for example, are mixed and extracted.

For example, when the state where the evaluation value is lower than the predetermined threshold continues, the bias value setting unit 75 may set the bias value so that the proportion at which the information belonging to the first data group 91 is extracted is gradually reduced and the proportion at which the information belonging to the second data group 92 is extracted is increased.

As a result, the task processing module 72 initially performs task processing on the basis of information related to the task, but when a state where the evaluation value for the processing result is low and appropriate processing is not implemented continues, the task processing module 72 performs processing based on information not related to the task.

Furthermore, when the state where the evaluation value is lower than the predetermined threshold continues, the bias value setting unit 75 may set the bias value such that the information belonging to the first data group 91 is extracted until a predetermined number of times is exceeded, but may set the bias value such that the information belonging to the second data group 92 is extracted after the predetermined number of times is exceeded.

In either case, by performing processing based on information not related to the task or information having low relevance to the task, it becomes possible to cause creative and highly flexible processing to solve a task that cannot be solved by processing based on information related to the task or information having high relevance to the task.

The storage module 77 stores, as the first data group 91 and the second data group 92, information necessary for task processing, such as information generated in real time on the basis of model information (ex: typical information of speech and object grasping pattern information) to be adapted, element information (ex: speech topic and movement route) constituting output information, sensor information, and environment information, a learning model to be applied under each situation, and a learned model.

The output unit 74 has a configuration corresponding to the output unit 33 (FIG. 1), and outputs a processing result higher than a predetermined evaluation value evaluated as an appropriate processing result for solving the task in the processing result evaluation module 73.

The processing result output by the output unit 74 is to be performed by an appropriate method according to the situation to be applied, and is voice output, text output, information presentation, manipulator control, equipment control, movement and change of the system itself, and the like.

More specifically, for example, in the case of a task related to speech recognition, the processing result is text, voice, or appropriate information presentation (e.g., presentation of map information for a question related to route guidance) of an answer responding to the "user's question content".

Furthermore, in the case of a task related to object grasping, the processing result is output of manipulator control information for actually grasping an object or manipulator control itself.

Note that after the processing result is output, feedback based on the processing result may be recognized on the basis of a sensor or new input information, and may be fed back to the task processing module 72 or the processing result evaluation module 73. In this case, the task processing module 72 or the processing result evaluation module 73 executes processing or evaluates the processing result according to the feedback.

Moreover, in the case of a task related to speech recognition, the feedback is, for example, a user reaction (expression or emotion) based on user sensing, evaluation input information by the user, an estimation result of whether the user has attained the goal based on the user's behavior, and the like.

Furthermore, in the case of a task related to object grasping, the feedback is, for example, a result of whether or not the object has been grasped without any problem, the number of trials until successful grasping, stress information actually applied to the object, and the like.

Figure 2:
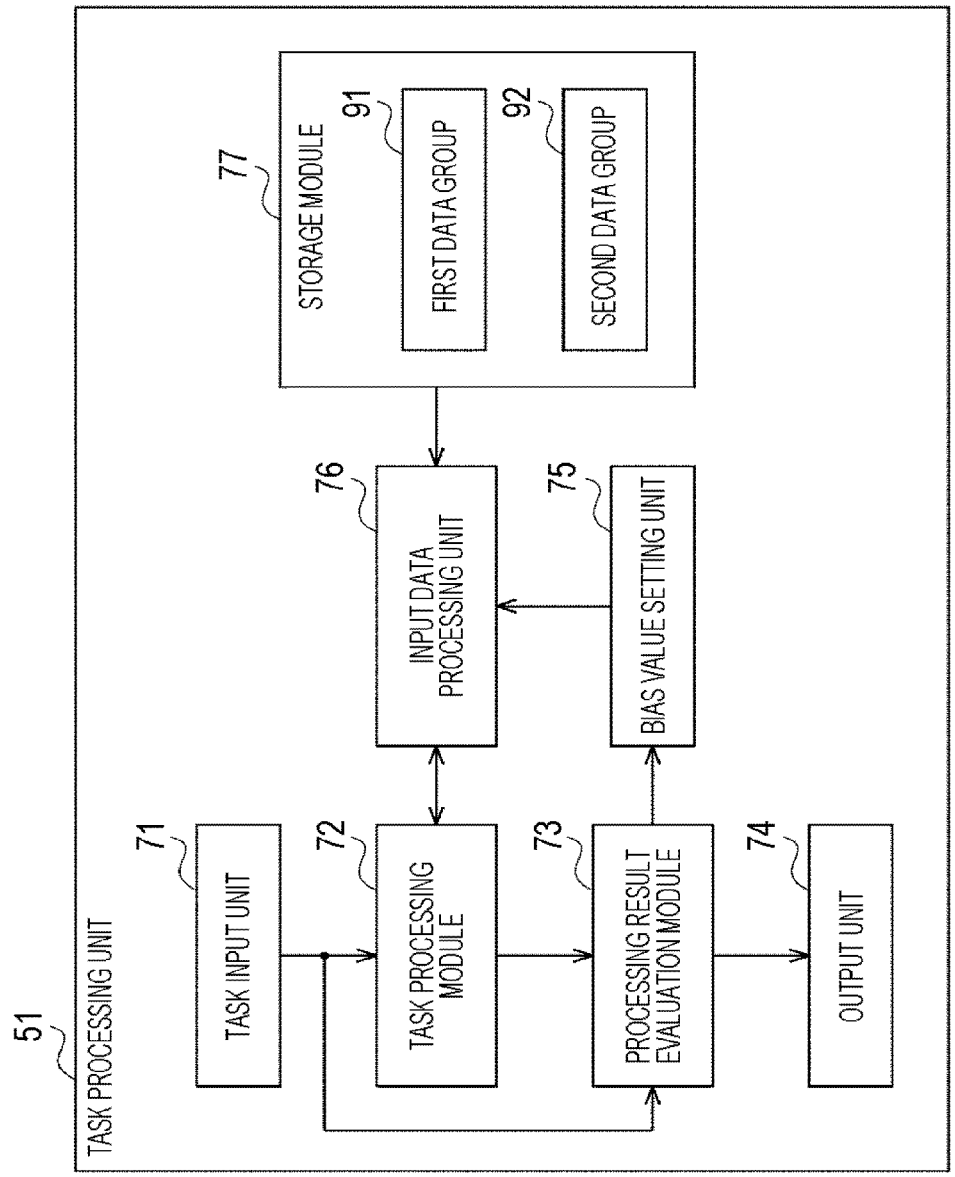
FIG. 2 is a diagram illustrating a configuration example of a first embodiment of a task processing unit of FIG. 1.

<Task Processing by Task Processing Unit of FIG. 2>

Figure 3:
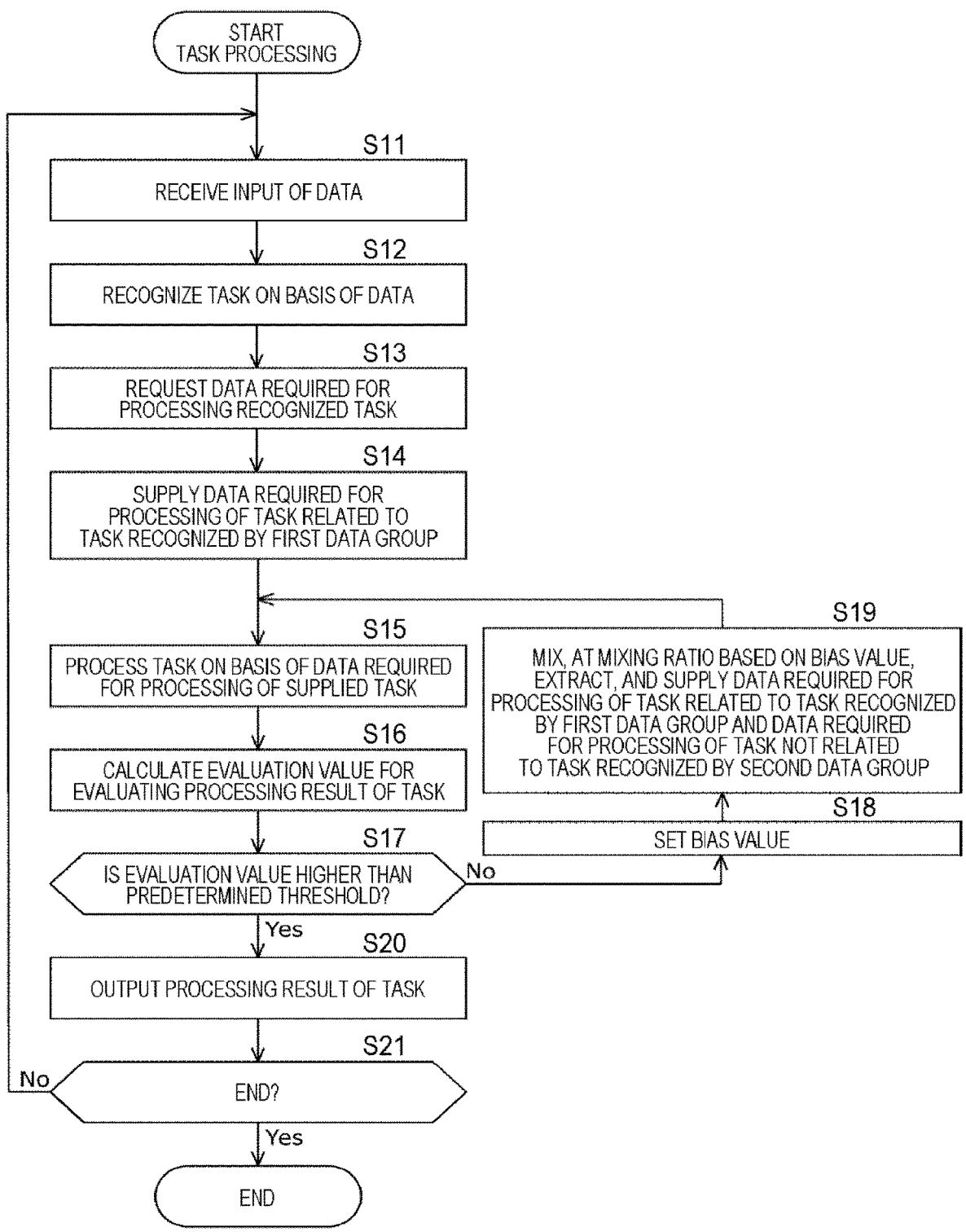
FIG. 3 is a flowchart illustrating task processing by the task processing unit of FIG. 2.

Next, task processing by the task processing unit 51 of FIG. 2 will be described with reference to the flowchart in FIG. 3.

In step S11, the task input unit 71 receives various data related to an input result to be input by the input unit 32 or a detection result to be detected.

In step S12, the task input unit 71 comprehends the content of the task to be solved on the basis of the data related to the input result and the detection result of the input unit 32, and supplies information on the comprehended task to the task processing module 72.

In step S13, on the basis of the information of the comprehended task supplied from the task input unit 71, the task processing module 72 requests the input data processing unit 76 for data required for processing of the task.

In step S14, in response to the request from the task processing module 72, the input data processing unit 76 reads data related to the processing of the comprehended task from the storage module 77 and supplies the data to the task processing module 72.

More specifically, the input data processing unit 76 accesses the storage module 77, extracts and supplies, to the task processing module 72, information belonging to the first data group 91 including information related to the comprehended task or information having high relevance to the task that have been supplied from the task processing module 72.

In step S15, the task processing module 72 processes the task on the basis of the information belonging to the first data group 91 supplied from the input data processing unit 76, and outputs the processing result to the processing result evaluation module 73.

In step S16, the processing result evaluation module 73 calculates an evaluation value for evaluating whether or not the processing result appropriately solves the task, and evaluates the processing result.

In step S17, the processing result evaluation module 73 determines whether or not the evaluation value for the processing result of the task processing module 72 is higher than the predetermined threshold and the processing result appropriately solves the task.

In step S17, in a case where the processing result evaluation module 73 determines that the evaluation value is lower than the predetermined threshold and the processing result does not appropriately solve the task, the processing proceeds to step S18.

In step S18, the processing result evaluation module 73 outputs, to the bias value setting unit 75, an evaluation value lower than the predetermined threshold having been calculated. Then, the bias value setting unit 75 sets and outputs, to the input data processing unit 76, a bias value indicating the mixing ratio (proportion) of data extracted as information belonging to each of the first data group 91 and the second data group 92 on the basis of the evaluation value that is an evaluation for the processing result of the task processing module 72 or the number of times the evaluation value is regarded to be lower than the predetermined threshold.

In step S19, the input data processing unit 76 accesses the storage module 77, extracts and supplies, to the task processing module 72, the data belonging to the first data group 91 and the second data group 92 as the data necessary for the processing of the task at the mixing ratio based on the bias value, and the processing returns to step S15.

That is, the processing of steps S15 to S19 is repeated until the evaluation value for the processing result of the task processing module 72 is higher than the predetermined threshold and the processing result is regarded to appropriately solve the task.

Then, in step S17, when the evaluation value is higher than the predetermined threshold and the processing result is regarded to appropriately solve the task, the processing proceeds to step S20.

In step S20, the processing result evaluation module 73 outputs, to the output unit 74, a processing result that has an evaluation value higher than the predetermined threshold and is regarded to appropriately solve the task.

The output unit 74 (output unit 33) outputs a processing result that has an evaluation value higher than the predetermined threshold and is regarded to appropriately solve the task.

In step S21, the task input unit 71 determines whether or not there is no data input of a new task and an instruction to end the processing is given. In a case where the instruction to end the processing is not given, the processing returns to step S11.

That is, the processing of steps S11 to S21 is repeated until the instruction to end the processing is given.

Then, in a case where it is regarded in step S21 that the instruction to end has been given, the processing ends.

With the above processing, the task processing module 72 first receives supply of data required for processing from the first data group 91, which is information related to the task or information having high relevance to the task, and processes the task.

Here, in a case where the evaluation value of the processing result of the task processing module 72 is lower than the predetermined threshold and the processing result is regarded not to appropriately solve the task, the bias value setting unit 75 mixes at a predetermined proportion, the data of the second data group 92, which is data not related to the task, in addition to the data of the first data group 91, which is data related to the task, as data necessary in the task processing implemented in the task processing module 72, and sets and supplies, to the input data processing unit 76, a bias value to be supplied to the task processing module 72.

Therefore, the input data processing unit 76 supplies, to the task processing module 72, the data of the second data group 92, which is data not related (low in relevance) to the task, in addition to the data of the first data group 91, which is data related (high in relevance) to the task, as data necessary in the task processing implemented in the task processing module 72.

When processing the task, the task processing module 72 processes the task using the data of the second data group 92 not related (low in relevance) to the task in addition to the data belonging to the first data group 91 related (high in relevance) to the task. Therefore, processing different from the processing using the data related to the task is performed.

As a result, a solving method for a task that cannot be solved with the data belonging to the first data group 91 related (high in relevance) to the task can be searched for and implemented by creative and highly flexible processing using the data of the second data group 92 not related (low in relevance) to the task.

Furthermore, the bias value setting unit 75 may mix the data of the first data group 91, which is data related (high in relevance) to the task, and the data of the second data group 92, which is data not related (low in relevance) to the task, as the data necessary for the task processing implemented in the task processing module 72, and set and supply, to the input data processing unit 76, a bias value to be supplied to the task processing module 72 so that the mixing ratio of the data of the second data group gradually increases each time the state where the evaluation value is lower than the predetermined threshold is repeated.

Furthermore, when the state where the evaluation value is lower than the predetermined threshold is repeated, the data used for the processing of the task may be gradually switched from the data belonging to the first data group 91 to the data belonging to the second data group according to the number of times the state where the evaluation value is lower than the predetermined threshold is repeated.

Moreover, when the state where the evaluation value is lower than the predetermined threshold is repeated a predetermined number of times, the data used for the processing of the task may be switched from the data belonging to the first data group 91 to the data belonging to the second data group.

In either case, with such processing, when the state where the evaluation value is lower than the predetermined threshold continues, the processing of the task gradually changes to processing using data not related to the task, and therefore the processing of the task changes to creative and highly flexible processing.

Furthermore, when the state where the evaluation value is lower than the predetermined threshold continues, the task is processed with the data used for the processing of the task being switched to data not related (low in relevance) to the task, and therefore the processing of the task changes to creative and highly flexible processing.

In either case, the data required for the processing of the task changes from data whose relevance to the task is high to that is low, so that the processing of the task can be changed to creative and highly flexible processing.

As a result, even for a task that cannot be solved only by data related to the task, it becomes possible to search for and implement processing for appropriately solving the task.

For example, in a case of a task related to a navigation system, a route search of a mobile robot itself (including an autonomous vehicle), or the like, it becomes possible to search for a more suitable solution by setting not only an initially assumed evaluation function and an input evaluation function (data belonging to the first data group 91) but also a new evaluation function (data belonging to the second data group 92) based on wider information and model among various existing evaluation functions.

Furthermore, in a case of a task related to grasping of a target object that is not initially assumed, it becomes possible to achieve more flexible grasping by applying the technology of the present disclosure.

That is, it becomes possible to refer to not only the information regarding the assumed target object (shape, gravity center position, hardness, fragility, suitable grasping approach model, and mobile approach model) (data belonging to the first data group 91) but also other information and models (data belonging to the second data group 92) and expand the trial method to cope with the case more flexibly. Therefore, even if the target object deviates from the initially assumed range, it becomes possible to achieve grasping.

Furthermore, in the case of a task related to a navigation system, a route search of a mobile robot itself (including an autonomous vehicle), or the like, or a task related to grasping of a target object that is not initially assumed as described above, it becomes possible to search for a wider solution or escape from a local solution at the time of stuck processing, by also referring to a data source or model (data belonging to the second data group 92) other than the originally assumed situation (data belonging to the first data group 91).

Moreover, in a case of a task related to generation of a cooking recipe, it becomes possible to output a more creative recipe with reference to an approach (data belonging to the second data group 92) other than a target cooking category and an approach normally assumed in cooking (data belonging to the first data group 91).

That is, it becomes possible to refer to a recipe of Japanese cuisine in generating a recipe of Chinese cuisine and to take in art-related information irrelevant to the cuisine in serving the cuisine.

Note that it does not mean that more distant information is sufficient to be combined but an evaluation function (whether or not a certain standard is satisfied in taste, appearance, and human eating and drinking, and the like) for evaluating establishment as cuisine may be included. The processing result evaluation module 73 may evaluate a candidate output result on the basis of this standard.

Furthermore, the cuisine is an example, and the present disclosure is effective for all processing tasks of creating by combining elements and methods, and for example, it may be caused to search for novel writing, automatic generation of a video scene, and the like.

Moreover, in the case of a task related to speech generation, speech is usually generated using a term, discourse, and speech generation logic that form speech on the basis of an originally assumed usage situation and a target user (data belonging to the first data group 91). However, there are many cases where the user makes an unexpected utterance, the situation changes, and more flexible speech response is required. In such an unexpected situation and case, it becomes possible to implement more flexible speech generation by referring also to an unexpected term group, discourse example, and speech generation model (data belonging to the second data group 92).

Furthermore, it becomes possible to set many more types of options such as a conservative solution (data belonging to the first data group 91) and a more ambitious solution (data belonging to the second data group 92) in the overall tasks including general tasks, not limited to the above-described series of tasks such as a task related to route search or the like by a navigation system or a mobile robot itself (including an autonomous vehicle), a task related to grasping of a target object that is not initially assumed, a task related to generation of a cooking recipe, and a task related to speech generation.

Here, "conservative" and "ambitious" indicate ease of being selected that is calculated on the basis of a degree of risk for the user and a past selection tendency by the user. More specifically, the conservative solution is, for example, a solution having a relatively low risk for the user or a solution that is easily selected by the user. Furthermore, the ambitious solution is, for example, a solution having a relatively high risk for the user or a solution that is sometimes selected by the user but is difficult to be selected.

Moreover, in a case where the task is interpreted as an optimization problem, flexible problem solving may be achieved by gradually relaxing constraint conditions and making a trial.

That is, there is a case where the originally set constraint condition (data belonging to the first data group 91) is so severe that the task that can be responded is too limited. However, for an event wider than the initially assumed condition, more flexible response becomes possible by gradually relaxing the condition (by gradually using data belonging to the second data group 92).

Furthermore, in the above, an example has been described in which the processing result evaluation module 73 outputs, to the output unit 74, one processing result that has an evaluation value higher than the predetermined threshold and is regarded to appropriately solve the task. However, a plurality of processing results having different evaluation values may be output together with the evaluation value, presented to the user, and selectable to the user. Such processing makes it possible to present the user a plurality of processing results higher than a predetermined threshold, for example, and makes it possible to achieve a flexible response including judgement by the user based on the evaluation value.

Moreover, in a case where there is a plurality of solutions for a task, there is a case where search by normal trial (search using data belonging to the first data group 91) results in the nearest local solution (becomes impossible to further search for solutions). However, application of the technology of the present disclosure makes it possible to reach a more optimal solution by temporarily suspending the local solution and performing a wider range of search (search using data belonging to the second data group 92).

That is, for example, in a case of a task related to path planning of a robot, under a situation where there is a plurality of evaluation functions (shortest route, route comfortable for user, route with less risk, and so forth), it becomes possible to search for a solution that is not initially assumed but is more optimal by not ending the search with the output of the solution based only on the initially assumed evaluation function and adapting also an evaluation function that is not assumed.

Furthermore, in reinforcement learning, learning according to an evaluation function (reward) is performed, and hence setting of the evaluation function becomes important. The evaluation function is usually set in advance (by human design), but automation of evaluation function (reward amount) setting is required.

Application of the technology of the present disclosure makes it possible to flexibly use the evaluation function (may be plural) related to the task and the evaluation function not related to the task or the evaluation function automatically generated each time. Therefore, it becomes possible to more flexibly solve the problem.

2. Modification of First Embodiment

In the above, an example has been described in which the processing in the task processing module 72 is changed by mixing (or switching), on the basis of the bias value, the two types of data of the first data group including the data group related to the task (having high relevance to the task) and the second data group including the data group not related to the task (having low relevance to the task).

However, the data required for the task processing may be classified into three or more types on the basis of the relevance with the task, and the data with lower relevance may be gradually used for the task processing according to the number of times the evaluation value of the processing result of the task processing module 72 is regarded to be lower than a predetermined threshold.

Figure 4:
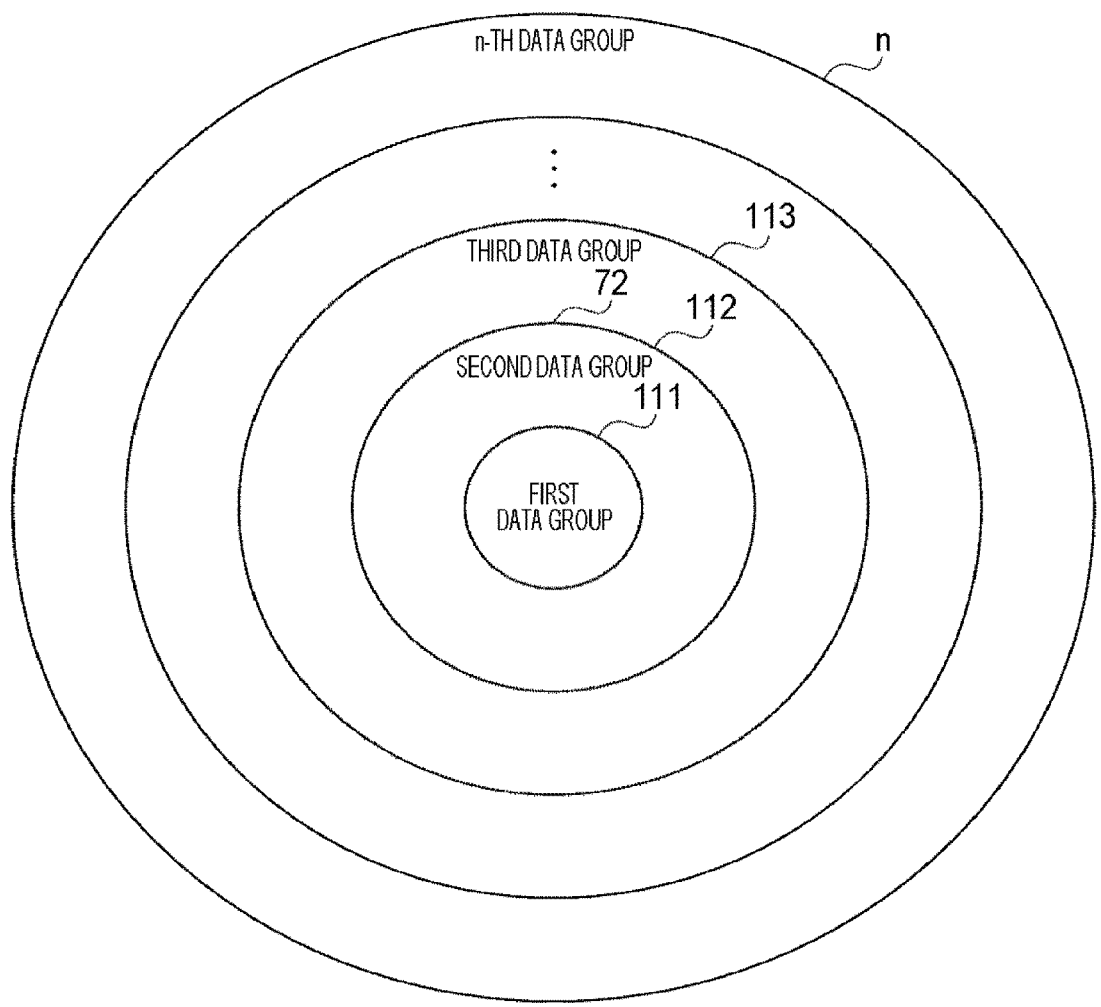
FIG. 4 is a diagram illustrating a modification of the first embodiment.

That is, for example, data required for the processing of a task is classified into a first data group 111 to an n-th data group as illustrated in FIG. 4.

In FIG. 4, it is assumed that the first data group 111 is a data group having the highest relevance to the task, the second data group 112 is a data group having the second highest relevance to the task after the first data group 111, the third data group 113 is a data group having the third highest relevance to the task after the second data group 112, and thereafter the n-th data group n according to the level of relevance to the task are set similarly. That is, the n-th data group n has the lowest relevance to the task.

Then, in a case where the first data group 111 is used for the processing of the task and the evaluation value of the processing result is lower than a predetermined threshold, in the next processing, not only the first data group 111 but also the second data group 112 is used, and thereafter, the data up to the n-th data group n are sequentially used for the processing of the task until the evaluation value becomes higher than the predetermined threshold.

Such processing makes it possible to use the data used for the processing of the task in descending order of relevance of the task. Therefore, it becomes possible to appropriately solve a task that cannot be solved only by the data group related to the task.

<Modification of First Configuration Example of Task Processing Unit>

Next, a modification of the first configuration example of the task processing unit will be described with reference to FIG. 5.

Figure 5:
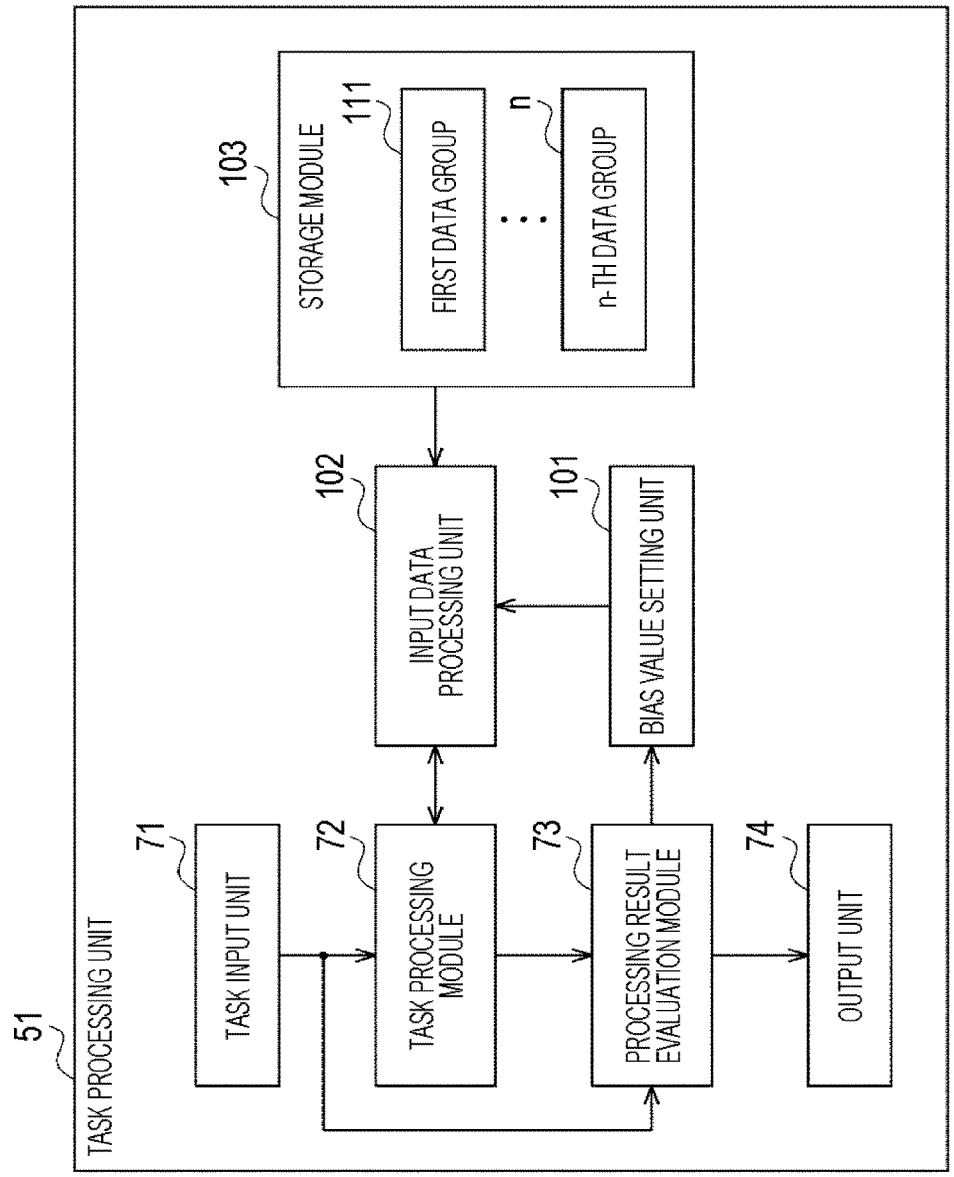
FIG. 5 is a diagram illustrating a configuration example the task processing unit of FIG. 1 in a modification of the first embodiment.

Note that in FIG. 5, the configuration having the same function as that of the configuration of FIG. 2 is given the same reference sign, and the description thereof will be appropriately omitted.

That is, in the task processing unit 51 of FIG. 5, the configuration different from that in the task processing unit 51 of FIG. 2 is that a bias value setting unit 101, an input data processing unit 102, and a storage module 103 are provided instead of the bias value setting unit 75, the input data processing unit 76, and the storage module 77.

The bias value setting unit 101 is similar in basic function to the bias value setting unit 75. Moreover, however, the bias value setting unit 101 sets the bias value so as to change the data group to be supplied to the task processing module 72 such that the data group having low relevance to the task increases according to the number of times the evaluation value is lower than the predetermined threshold and it is determined that the task cannot be appropriately solved.

The input data processing unit 102 extracts and supplies, to the task processing module 72, data based on the bias value to be supplied from the bias value setting unit 101 from the first data group 111 to the n-th data group that are stored in the storage module 103.

The storage module 103 stores the first data group 111 and the n-th data group n described with reference to FIG. 4, instead of the first data group 91 and the second data group 92 in the storage module 77.

That is, in the first data group 111 to the n-th data group, the first data group 111 is the data group most related to the task, and the second data group 112, the third data group 113, . . . , the n-th data group n are data groups having high relevance to the task in this order.

<Task Processing by Task Processing Unit of FIG. 5>

Figure 6:
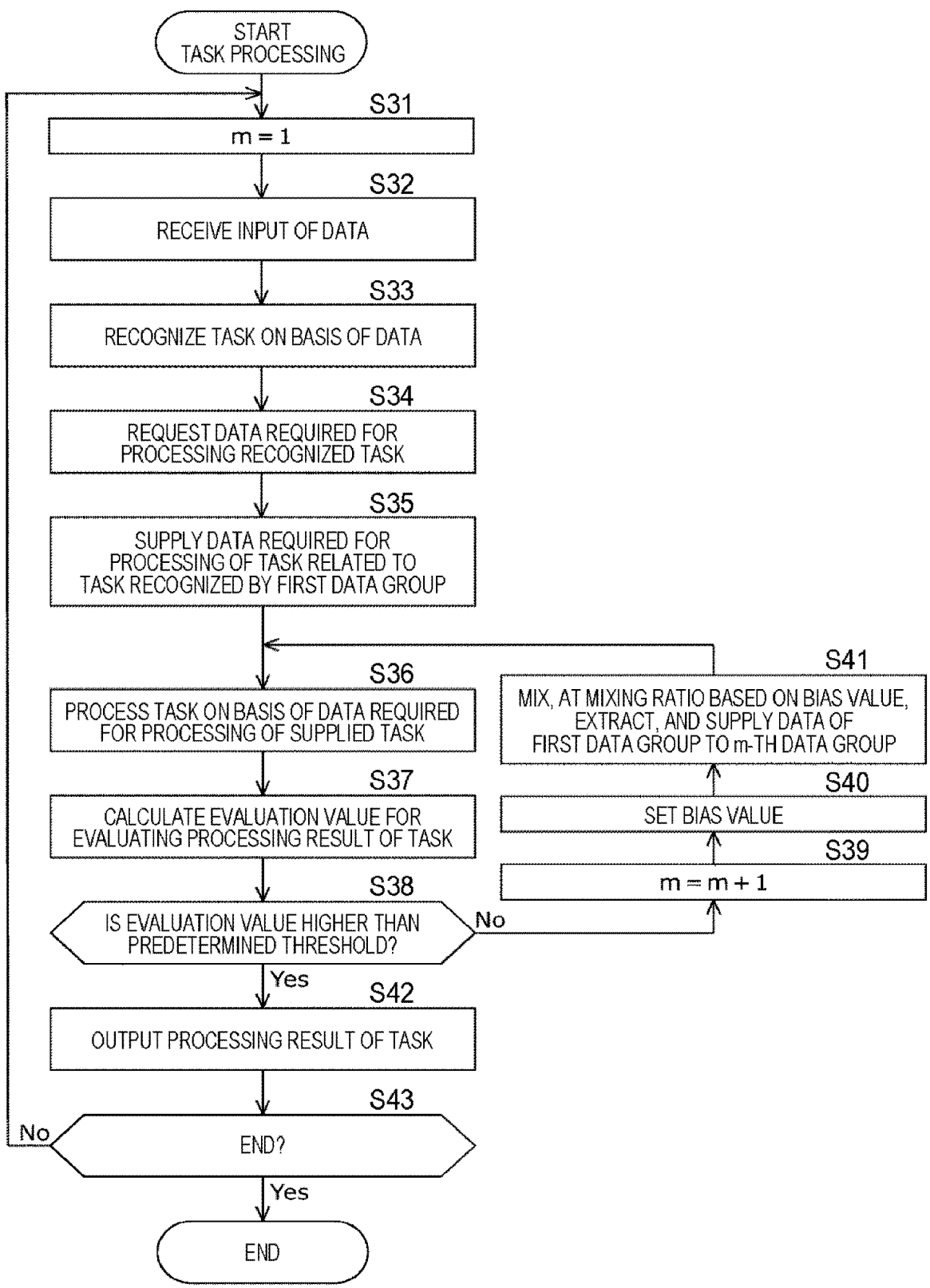
FIG. 6 is a flowchart illustrating task processing by the task processing unit of FIG. 5.

Next, task processing by the task processing unit 51 of FIG. 5 will be described with reference to the flowchart in FIG. 6. Note that the processing in steps S32 to S38 in FIG. 6 is similar to the processing in steps S11 to S17 in FIG. 3, and thus the description thereof will be appropriately omitted.

In step S31, the bias value setting unit 101 initializes a counter m for identifying a data group stored in the storage module 103 to 1.

In steps S32 to S38, the task is processed by the task processing module 72 using the first data group 111, and the processing result is supplied to the processing result evaluation module 73 to calculate the evaluation value.

Then, in a case where the evaluation value is lower than the predetermined threshold in step S38, the processing proceeds to step S39.

In step S39, the bias value setting unit 101 increments the counter m by 1.

In step S40, the bias value setting unit 101 sets and outputs, to the input data processing unit 102, the bias value so that the data of the data group corresponding to the counter m is supplied to the processing of the task processing module 72.

In step S41, the input data processing unit 102 accesses the storage module 103, and extracts and supplies, to the task processing module 72, data necessary for processing of the task from, for example, data belonging to the first data group to a m-th data group m among the first data group to the n-th data group n on the basis of the bias value, and the processing returns to step S36.

That is, the processing of steps S36 to S41 is repeated until the processing result of the task processing module 72 is regarded as a processing result for appropriately solving the task, and the evaluation value for the processing result becomes higher than the predetermined threshold, and the processing of the task in which the data of a data group having gradually low relevance to the task is used among the first data group to the n-th data group n is repeated corresponding to the number of times of repetition.

Then, in step S41, when the evaluation value is higher than the predetermined threshold and the processing result is regarded to appropriately solve the task, the processing proceeds to step S42.

Then, in step S42, the output unit 74 outputs a processing result in which the evaluation value is higher than the predetermined threshold and the task is regarded to be appropriately solved.

With the above processing, the task processing module 72 first receives supply of data required for processing from the first data group 91, which is data related to the task, and processes the task.

Here, in a case where the processing result of the task processing module 72 does not appropriately solve the task, and the evaluation value is lower than the predetermined threshold, as data required by the bias value setting unit 75 in the task processing implemented in the task processing module 72, the data of a data group not related to the task gradually (having lower relevance to the task) is gradually included and supplied to the task processing module 72.

Therefore, when processing the task, the task processing module 72 performs processing using the data of the data group not related to the task gradually until the processing result is regarded to appropriately solve the task, and as a result, it becomes possible to implement creative and highly flexible processing.

With such processing, when the state where the evaluation value is lower than the predetermined threshold continues, the task is gradually processed using data not related to the task, and therefore it becomes possible to process the task while gradually changing to creative and highly flexible processing.

Thus, the data required for the processing of the task gradually changes from data whose relevance to the task is high to that is low, so that it becomes possible to appropriately solve the task that cannot be solved only by the data related to the task.

Note that in the above description, an example has been described in which when the state where the evaluation value is lower than the predetermined threshold continues, the task is processed with data not related to the task used so as to be gradually included. However, as the state where the evaluation value is lower than the predetermined threshold is repeated, only the data having low relevance may be extracted gradually and used for the task processing.

3. Second Embodiment

In the above, the example has been described in which the input data processing unit 76 or 102 accesses the storage module 77 or 103, and mixes and supplies, to the task processing module 72, the data belonging to the first data group 91 and the second data group 92 or the data belonging to the first data group 111 and the n-th data group n according to the bias value.

However, a main storage module may be set, data belonging to the first data group may be stored by default, the task processing module may process the task by reading the data stored in the main storage module, and when the processing result cannot appropriately solve the task, data belonging to the second data group may be increased in the main storage module according to the bias value.

Figure 7:
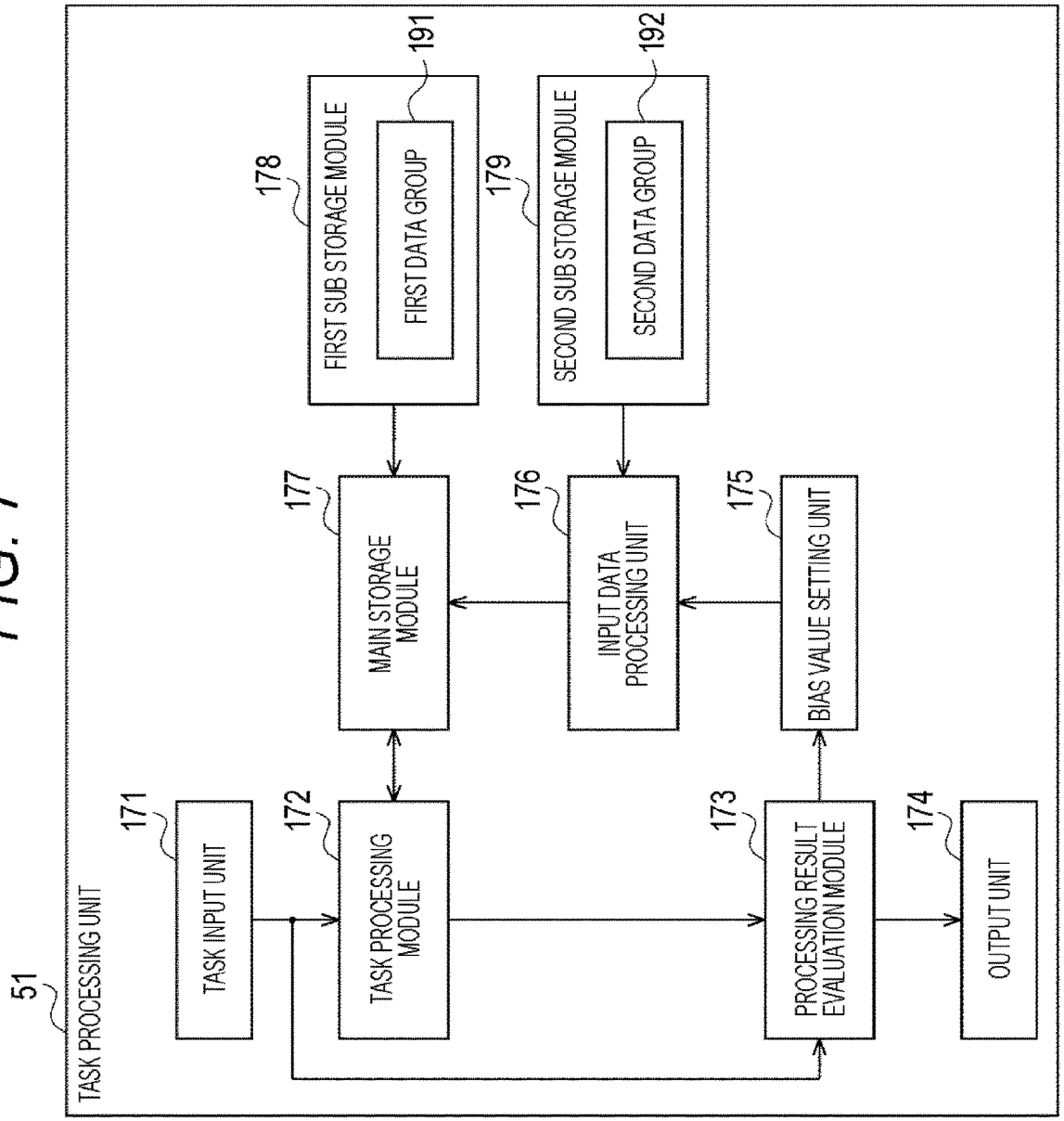
FIG. 7 is a diagram illustrating a configuration example of a second embodiment of the task processing unit of FIG. 1.

FIG. 7 illustrates a configuration example of the task processing unit 51 in which a main storage module that stores data belonging to the first data group by default and gradually increases and stores data belonging to the second data group according to the bias value is provided, and the task processing module processes the task on the basis of the data stored in the main storage module.

The task processing unit 51 in FIG. 7 includes a task input unit 171, a task processing module 172, a processing result evaluation module 173, an output unit 174, a bias value setting unit 175, an input data processing unit 176, a main storage module 177, a first sub storage module 178, and a second sub storage module 179.

Note that the task input unit 171, the task processing module 172, the processing result evaluation module 173, and the output unit 174 are similar in configuration to the task input unit 71, the task processing module 72, the processing result evaluation module 73, and the output unit 74 in FIG. 2, and thus the description thereof will be appropriately omitted.

However, the task processing module 172 is similar in basic function to the task processing module 72, but is different from the task processing module 72 in that the task processing module 72 processes a task by requesting and acquiring data necessary for processing from the input data processing unit 76, whereas the task processing module 172 processes a task on the basis of the data stored in the main storage module 177.

Furthermore, the configurations of the main storage module 177, the first sub storage module 178, and the second sub storage module 179 are basically similar to those of the storage module 77, and may be configured in the storage unit 34, may be configured as separate storage units, or may be configured by an external server via a network.

Moreover, the first sub storage module 178 stores a first data group 191 corresponding to the first data group 91, and the second sub storage module 179 stores a second data group 192 corresponding to the second data group 92.

On the basis of the evaluation value supplied from the processing result evaluation module 173, the bias value setting unit 175 sets a bias value with which the input data processing unit 176 reads data belonging to the second data group 192 stored in the second sub storage module 179 and specifies the data amount to be stored in the main storage module.

More specifically, the bias value setting unit 175 sets the bias value so as to increase the extraction amount of data belonging to the second data group 192 as the number of times the evaluation value is lower than the predetermined threshold increases, for example.

On the basis of the bias value supplied from the bias value setting unit 175, the input data processing unit 176 extracts and stores, into the main storage module 177, data of the second data group stored in the second sub storage module 179.

With such a configuration, in the main storage module 177, initially, data related to the task (high in relevance to the task) belonging to the first data group 191 stored in the first sub storage module 178 by default is extracted and stored, used for processing of the task in the task processing module 172, and a processing result is output.

Then, when the evaluation value of the processing result of the task processing module 172 is lower than the predetermined threshold and it is regarded that the task cannot be appropriately solved by the processing result, the input data processing unit 176, on the basis of the bias value set by the bias value setting unit 175, extracts and stores, into the main storage module 177, data not related to the task and belonging to the second data group 192 from the second sub storage module 179.

As a result, in the main storage module 177, in addition to the data belonging to the first data group 191, the data belonging to the second data group 192 is stored and used for the processing of the task by the task processing module 172.

When this processing is repeated, the evaluation value of the processing result of the task processing module 172 is lower than the predetermined threshold, and the number of times the processing result does not appropriately solve the task increases, data not related to the task (having low relevance to the task) and belonging to the second data group 192 stored in the main storage module 177 gradually increases.

That is, when a state where the processing result is not regarded to appropriately solve the task continues, data not related to the task is gradually stored in the main storage module 177, and the processing changes to task processing using data not related to the task (having high relevance to the task).

As a result, the processing is changed to processing in which data not related to the task (having low relevance to the task) increases with respect to the task that cannot be solved only by the data related to the task (having high relevance to the task), so that it becomes possible to solve the task by creative and highly flexible processing.

<Task Processing by Task Processing Unit of FIG. 7>

Figure 8:
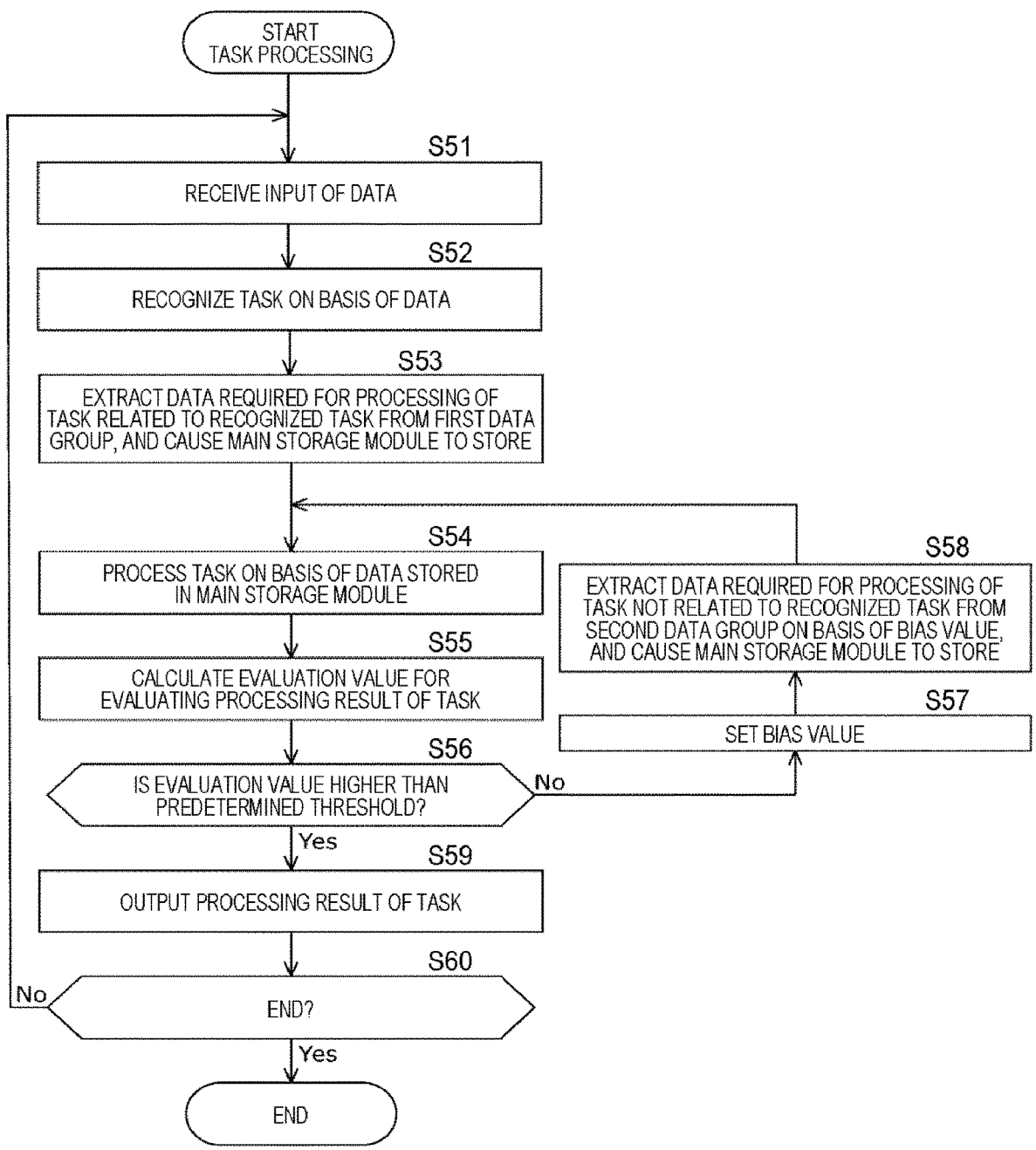
FIG. 8 is a flowchart illustrating task processing by the task processing unit of FIG. 7.

Next, task processing by the task processing unit 51 of FIG. 7 will be described with reference to the flowchart in FIG. 8.

In step S51, the task input unit 171 receives various data related to an input result to be input by the input unit 32 or a detection result to be detected.

In step S52, the task input unit 171 comprehends the content of the task to be solved on the basis of the data related to the input result and the detection result of the input unit 32, and supplies information on the comprehended task to the task processing module 172.

In step S53, the task processing module 72 supplies, to the main storage module 177, information on the comprehended task supplied from the task input unit 71. In response to this, the main storage module 177 accesses the first sub storage module 178, and extracts and stores data related to the task and belonging to the first data group 191.

In step S54, the task processing module 72 processes the task on the basis of the data stored in the main storage module 177, and outputs a processing result to the processing result evaluation module 173.

Note that in the first processing, only the data related to the task and belonging to the first data group 191 that is default is stored in the main storage module 177, and therefore the task is processed only with the data related to the task.

In step S55, the processing result evaluation module 173 calculates an evaluation value for evaluating whether or not the processing result appropriately solves the task, and evaluates the processing result.

In step S56, the processing result evaluation module 173 determines whether or not the evaluation value for the processing result of the task processing module 172 is higher than the predetermined threshold and the processing result appropriately solves the task.

In step S56, in a case where the processing result evaluation module 173 determines that the evaluation value is lower than the predetermined threshold and the processing result does not appropriately solve the task, the processing proceeds to step S57.

In step S57, the processing result evaluation module 173 outputs, to the bias value setting unit 175, an evaluation value lower than the predetermined threshold having been calculated. Then, on the basis of the evaluation value that is an evaluation for the processing result of the task processing module 172, the bias value setting unit 175 sets and outputs, to the input data processing unit 176, a bias value indicating the extraction amount of the data belonging to the second data group 192 stored in the second sub storage module 179.

In step S58, the input data processing unit 176 accesses the second sub storage module 179, extracts data not related to the task (having low relevance to the task) from the second data group 192 on the basis of the bias value, and supplies the data to the main storage module 177 to store the data, and the process returns to step S54.

That is, until the evaluation value for the processing result of the task processing module 172 becomes higher than the predetermined threshold and the processing result is regarded to appropriately solve the task, the processing of steps S54 to S58 is repeated, and the processing of the task in a state where the data amount of the second data group 192 stored in the main storage module 177 gradually increases is repeated.

Then, in step S56, when the evaluation value is higher than the predetermined threshold and the processing result is regarded to appropriately solve the task, the processing proceeds to step S59.

In step S59, the processing result evaluation module 173 outputs, to the output unit 174, a processing result that has an evaluation value higher than the predetermined threshold and is regarded to appropriately solve the task.

The output unit 174 outputs a processing result that has an evaluation value higher than the predetermined threshold and is regarded to appropriately solve the task.

In step S60, the task input unit 171 determines whether or not there is no data input of a new task and an instruction to end the processing is given. In a case where the instruction to end the processing is not given, the processing returns to step S51.

That is, the processing of steps S51 to S60 is repeated until the instruction to end the processing is given.

Then, in a case where it is regarded in step S60 that the instruction to end has been given, the processing ends.

With the above processing, in the first processing, the task processing module 172 processes the task by the data of only the first data group 191, which is data related to the task (having high relevance to the task), stored in the main storage module 177.

Here, in a case where the processing result of the task processing module 172 does not appropriately solve the task and the evaluation value is lower than the predetermined threshold, the bias value setting unit 175 sets and supplies, to the input data processing unit 176, a bias value such that data of the second data group 192, which is data not related to the task (having low relevance to the task) and stored in the second sub storage module 179, is supplied to the main storage module 177.

Therefore, the input data processing unit 176 supplies, to the main storage module 177, and stores the data of the second data group 192, which is data not related to the task (having low relevance to the task), as data necessary for the task processing implemented in the task processing module 72.

When processing the task, the task processing module 72 uses the data belonging to the second data group 192 not related to the task (low in relevance to the task) in addition to the data belonging to the first data group 191 related to the task (high in relevance to the task) stored by default.

Then, when the state where the evaluation value of the processing result is lower than the predetermined threshold continues, the data belonging to the second data group 192 not related to the task increases as the data stored in the main storage module 177. Therefore, processing different from the processing using the data related to the task is performed, and as a result, it becomes possible to implement creative and highly flexible processing.

4. Third Embodiment

In the above, an example has been described in which the main storage module 177 is set, the data belonging to the first data group 191 related to the task is stored by default, the task processing module 172 processes the task on the basis of the data stored in the main storage module 177, and when the state where the evaluation value of the processing result is lower than the predetermined threshold continues, the data belonging to the second data group 192 not related to the task is increased in the main storage module 177, thereby implementing creative and highly flexible processing.

However, by providing the task processing module with a first task processing module that implements data processing on the basis of a specific processing pattern or a processing model and a second task processing module that implements processing of switching the processing pattern or the processing model used for the specific task processing in the first task processing module, the second task processing module may switch the processing pattern or the processing model according to the bias value.

Figure 9:
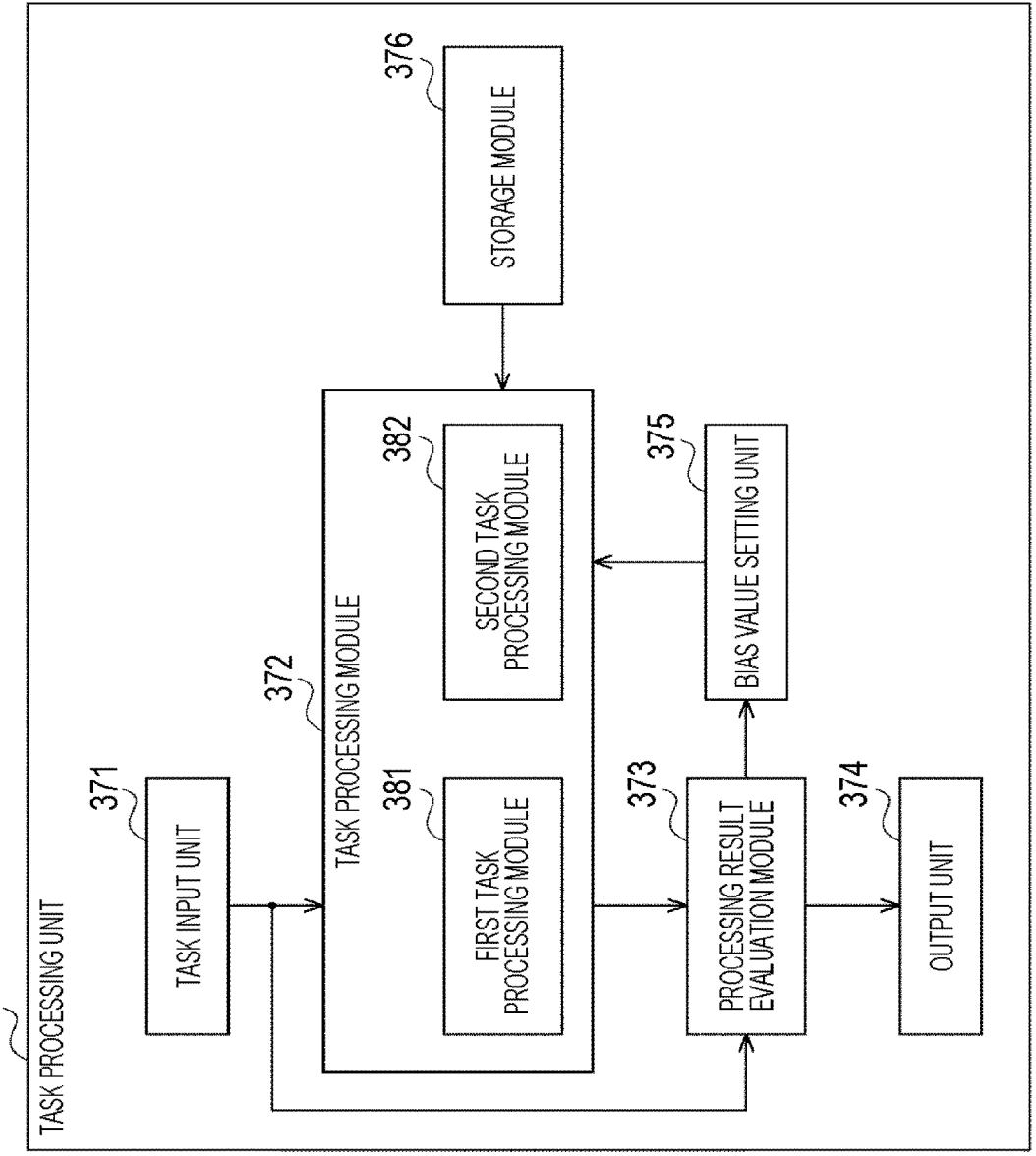
FIG. 9 is a diagram illustrating a configuration example of a third embodiment of the task processing unit of FIG. 1.

FIG. 9 is a configuration example of the task processing unit 51 in which by providing the task processing module with the first task processing module that implements data processing on the basis of a specific processing pattern or a processing model and the second task processing module that implements processing of switching the processing pattern or the processing model used for the specific task processing in the first task processing module, the second task processing module switches the processing pattern or the processing model according to the bias value.

The task processing unit 51 in FIG. 9 includes a task input unit 371, a task processing module 372, a processing result evaluation module 373, an output unit 374, a bias value setting unit 375, and a storage module 376.

Note that the task input unit 371, the processing result evaluation module 373, and the output unit 374 are similar in configuration to the task input unit 71, the processing result evaluation module 73, and the output unit 74 in FIG. 2, and thus the description thereof will be appropriately omitted.

The storage module 376 basically has a similar configuration to that of the storage module 77, and stores a processing pattern and a processing model for processing a task.

Note that the storage module 376 may be configured in the storage unit 34 or may be configured by an external server via a network.

The processing pattern and the processing model are, for example, a function, various parameters, and the like used for specific task processing executed by a first task processing module 381. Furthermore, the processing pattern and the processing model also include a learning model of machine learning, a learned model, a database in which gradients of feature amounts are described, and a network structure of an algorithm of machine learning.

The storage module 376 stores processing patterns and processing models at various levels for relevance to the task, from a processing pattern and a processing model having high relevance to the task to a processing pattern and a processing model having low relevance to the task.

Basically, similarly to the task processing module 72, the task processing module 372 processes a task recognized by the task input unit 371 and outputs a processing result to the processing result evaluation module 373.

However, the task processing module 372 includes the first task processing module 381 and a second task processing module 382, and implements the following task processing.

That is, the first task processing module 381 implements specific task processing on the basis of the processing pattern and the processing model set by the second task processing module 382, and outputs the processing result to the processing result evaluation module 373.

The second task processing module 382 extracts and supplies, to the first task processing module 381, a processing pattern and a processing model related to the task (high in relevance to the task) by default from the storage module 376.

Furthermore, in a case where the evaluation value for the processing result of the first task processing module is lower than the predetermined threshold and it is regarded that the task cannot be appropriately solved, the second task processing module 382 extracts and supplies, to the first task processing module 381, a processing pattern and a processing model that are not related to the task (have low relevance to the task) from the storage module 376 on the basis of the bias value set by the bias value setting unit 375.

In a case where the evaluation value for the processing result of the first task processing module is lower than the predetermined threshold and it is regarded that the task is not appropriately solved, the bias value setting unit 375 sets the bias value and supplies the bias value to the second task processing module 382 of the task processing module 372.

More specifically, the bias value setting unit 375 sets the bias value to 0 to 1. For example, when the default value is set to 0, the bias value setting unit 375 sets, to 0, the bias value for extracting a processing pattern or a processing model related to the task from the storage module 376.

Furthermore, in a case where the evaluation value for the processing result is lower than the predetermined threshold and a state where the task is not appropriately solved continues, the bias value is gradually changed to a value close to 1.

In this case, on the basis of the bias value, the second task processing module 382 reads, from the storage module 376, and supplies, to the first task processing module 381, the processing pattern or the processing model having lower relevance to the task as the bias value approaches 1.

With such a configuration, when the bias value is 0 by default, the second task processing module 382 supplies, to the first task processing module 381, a processing pattern or a processing model related to the task (high in relevance to the task) among processing patterns and processing models used for processing of the task stored in the storage module 376.

Therefore, the first task processing module 381 processes the task by the processing pattern and the processing model having high relevance to the task.

Furthermore, when the state where the evaluation value for the processing result of the first task processing module 381 is lower than the predetermined threshold continues, the bias value setting unit 375 gradually sets the bias value to a value close to 1.

Therefore, the second task processing module 382 gradually extracts and supplies, to the first task processing module 381, a processing pattern and a processing model having low relevance to the task.

As a result, the first task processing module 381 changes such that the task processing is gradually performed on the basis of the processing pattern or the processing model having low relevance to the task.

Furthermore, it becomes possible to search for and solve the task processing by creative and highly flexible processing by the processing changing such that the number of processing patterns and processing models not related to the task increases with respect to the task that cannot be solved by the processing pattern and the processing model related to the task.

<Task Processing by Task Processing Unit of FIG. 9>

Figure 10:
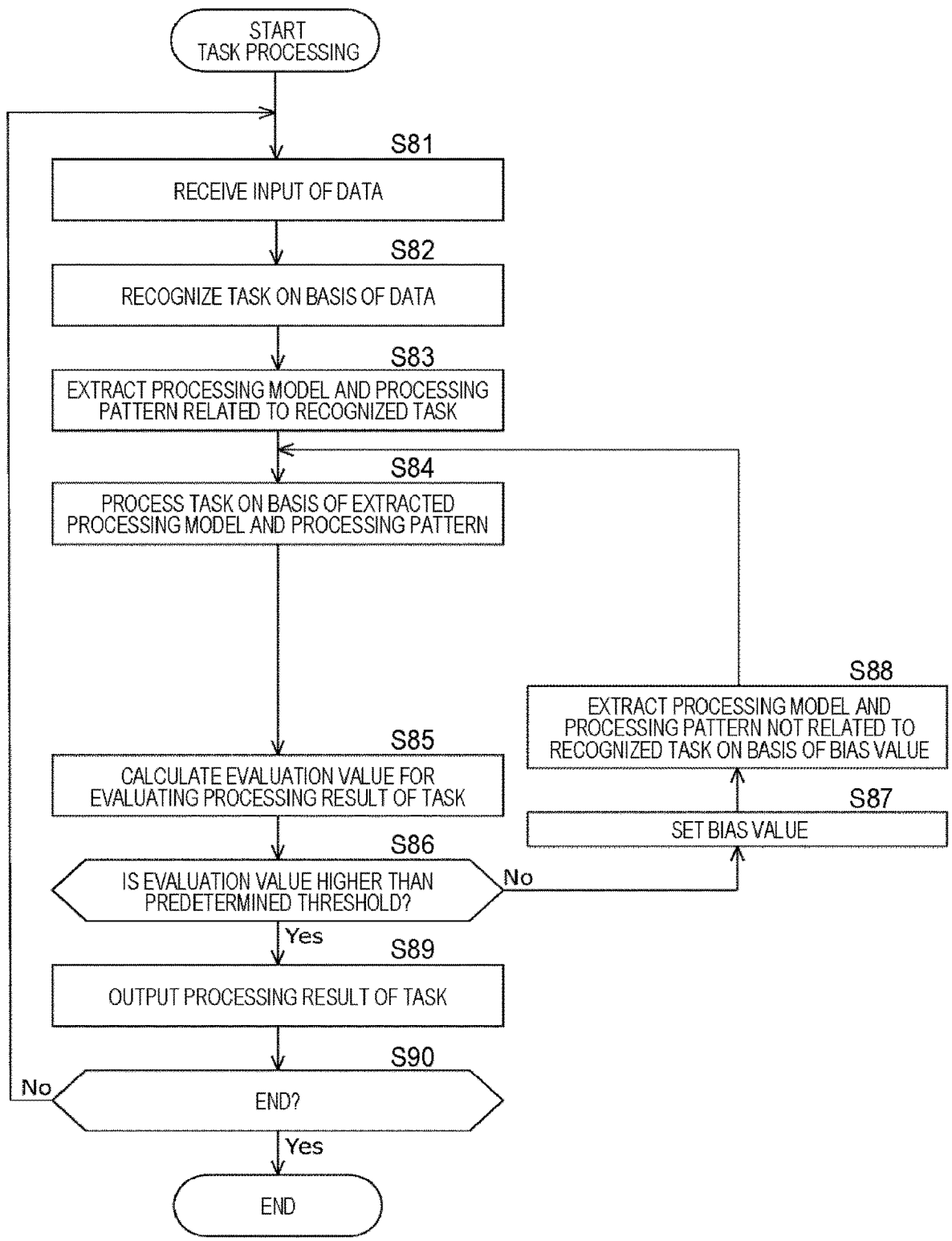
FIG. 10 is a flowchart illustrating task processing by the task processing unit of FIG. 9.

Next, task processing by the task processing unit 51 of FIG. 9 will be described with reference to the flowchart in FIG. 10.

In step S81, the task input unit 371 receives various data related to an input result to be input by the input unit 32 or a detection result to be detected.

In step S82, the task input unit 371 comprehends the content of the task to be solved on the basis of the data related to the input result and the detection result of the input unit 32, and supplies information on the comprehended task to the task processing module 372.

In step S83, the task processing module 372 acquires information on the comprehended task supplied from the task input unit 371.

In response to this, the second task processing module 382 extracts, from the storage module 376, and supplies, to the first task processing module 381, a processing pattern and a processing model in a state where the default bias value is 0, that is, having relevance to the task.

In step S84, the first task processing module 381 processes the task on the basis of the processing pattern and the processing model supplied from the second task processing module 382, and outputs the processing result to the processing result evaluation module 373.

In step S85, the processing result evaluation module 373 calculates an evaluation value for evaluating whether or not the processing result appropriately solves the task, and evaluates the processing result.

In step S86, the processing result evaluation module 173 determines whether or not the evaluation value for the processing result of the first task processing module 381 is higher than the predetermined threshold and the processing result appropriately solves the task.

In step S86, in a case where the processing result evaluation module 173 determines that the evaluation value is lower than the predetermined threshold and the processing result does not appropriately solve the task, the processing proceeds to step S87.

In step S87, the processing result evaluation module 373 outputs, to the bias value setting unit 375, an evaluation value lower than the predetermined threshold having been calculated. Then, the bias value setting unit 375 sets and outputs, to the task processing module 372, a bias value indicating the relevance to the task of the processing pattern and the processing model extracted from the storage module 376 by the second task processing module 382 on the basis of the evaluation value that is an evaluation for the processing result of the first task processing module 381 and the number of times the evaluation value is regarded to be lower than the predetermined threshold.

In step S88, the second task processing module 382 of the task processing module 372 accesses the storage module 376, extracts and supplies, to the first task processing module 381, a processing pattern and a processing model having relevance to the task based on the bias value, and the processing returns to step S84.

That is, the processing of steps S84 to S88 is repeated until the processing result of the first task processing module 381 is regarded as a processing result for appropriately solving the task, and the evaluation value for the processing result becomes higher than the predetermined threshold, and the processing is repeated while changing to the processing of the task using the processing pattern or the processing model having lower relevance with the task among the processing patterns and the processing models stored in the storage module 376 gradually.

Then, in step S86, when the evaluation value is higher than the predetermined threshold and the processing result is regarded to appropriately solve the task, the processing proceeds to step S89.

In step S89, the processing result evaluation module 373 outputs, to the output unit 374, a processing result that has an evaluation value higher than the predetermined threshold and is regarded to appropriately solve the task.

The output unit 374 outputs a processing result that has an evaluation value higher than the predetermined threshold and is regarded to appropriately solve the task.

In step S90, the task input unit 371 determines whether or not there is no data input of a new task and an instruction to end the processing is given. In a case where the instruction to end the processing is not given, the processing returns to step S81.

That is, the processing of steps S81 to S90 is repeated until the instruction to end the processing is given.

Then, in a case where it is regarded in step S90 that the instruction to end has been given, the processing ends.

With the above processing, in the first processing, the first task processing module 381 of the task processing module 372 processes the task by the processing pattern and the processing model related to the task stored in the storage module 376 by the second task processing module 382.

Here, in a case where the processing result of the first task processing module 381 does not appropriately solve the task, and the evaluation value is lower than the predetermined threshold, the bias value setting unit 375 extracts, from the storage module 177, a processing pattern or a processing model having low relevance to the task based on the evaluation value or the number of times the evaluation value is regarded to be lower than the predetermined threshold among the processing patterns and the processing models stored in the storage module 376 with respect to the second task processing module 382, sets and supplies, to the task processing module 372, a bias value to be supplied to the first task processing module 381.

Therefore, the second task processing module 382 extracts, from the storage module 376, and supplies, to the first task processing module 381, a processing pattern and a processing model having relevance to the task according to the bias value as a processing pattern and a processing model necessary for the task processing.

When processing the task, the first task processing module 381 processes the task by using a processing pattern or processing model that includes relevance to the task based on the bias value.

At this time, when the state where the evaluation value of the processing result is lower than the predetermined threshold continues, the processing pattern and the processing model stored in the storage module 376 change to a processing pattern and a processing model having low relevance to the task. Therefore, the processing changes to processing different from the processing using the processing pattern or the processing model related to the task, and as a result, it becomes possible to implement creative and highly flexible processing.

Note that, in any of the first embodiment to the third embodiment of the present disclosure described above, in setting the bias value, a processing pattern or a processing model having low relevance to the task may be selected or the weighting thereof may be changed according to the condition related to the task processing.

Examples of the condition related to the task processing include a risk of the task processing. That is, when the task has a low risk in the case of failure, it becomes possible to achieve search for higher creative and highly flexible task processing by positively selecting a processing pattern and a processing model having low relevance to the task.

Here, the task having a low risk in the case of failure is, for example, a task having a low limitation on the number of trials, a task having a low possibility of destroying the target or making the user uncomfortable as compared with other situations, and processing a task of performing communication with the user and information presentation such as a task performed when the user is in a positive state by action recognition, expression recognition, and emotion estimation based on voice and biometric information, and, in a case where processing having a virtual personality is required as in an agent model, a task in which the emotional state of the agent model is in a positive state. Therefore, in the case where the risk of the task processing is low, it is possible to present a solution including a possibility of destruction of the target or discomfort to the user, and in a case where the risk is high, it is possible to present only a solution in which such a possibility is easily avoided.

5. Example of Causing Software to Execute

It is possible to cause hardware to execute the above-described series of processing, but is also possible to cause software to execute the same. In a case where the series of processing is executed by software, a program constituting the software is installed from a recording medium to a computer incorporated in dedicated hardware, a general-purpose computer, for example, capable of executing various functions by installing various programs, or the like.

Figure 11:
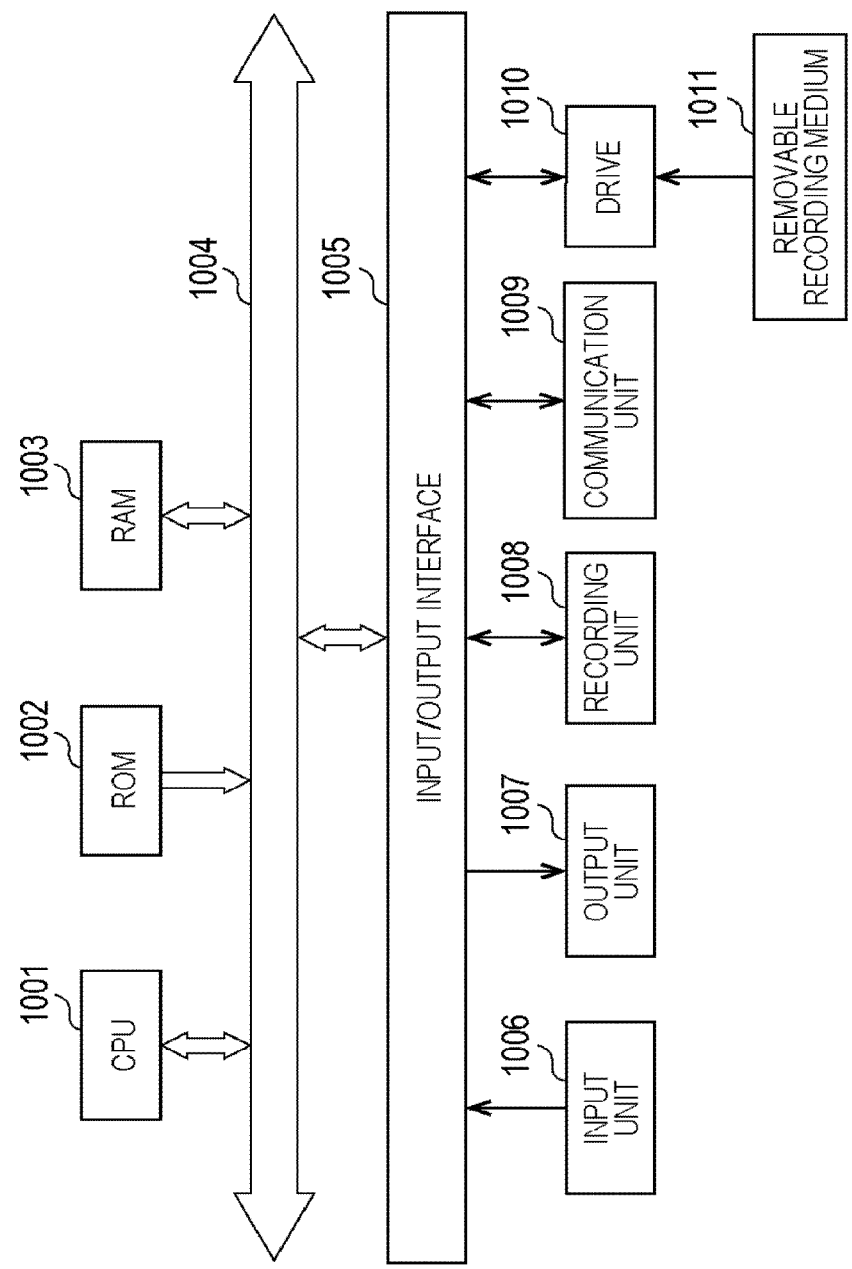
FIG. 11 is a diagram illustrating a configuration example of a general-purpose personal computer.

FIG. 11 illustrates a configuration example of a general-purpose computer. This personal computer includes a central processing unit (CPU) 1001. An input/output interface 1005 is connected to the CPU 1001 via a bus 1004. A read only memory (ROM) 1002 and a random access memory (RAM) 1003 are connected to the bus 1004.

The input/output interface 1005 is connected with an input unit 1006 including an input device such as a keyboard and a mouse with which the user inputs an operation command, an output unit 1007 that outputs, to a display device, a processing operation screen or an image of a processing result, a storage unit 1008 including a hard disk drive or the like that stores a program and various data, and a communication unit 1009 that includes a local area network (LAN) adapter and executes communication processing via a network represented by the Internet. Furthermore, a drive 1010 that reads and writes data from and to a removable storage medium 1011 such as a magnetic disk (including a flexible disk), an optical disk (including a compact disc-read only memory (CD-ROM) and a digital versatile disc (DVD)), a magneto-optical disk (including a mini disc (MD)), or a semiconductor memory is connected.

The CPU 1001 executes various processing according to a program stored in the ROM 1002 or a program read from the removable storage medium 1011 such as a magnetic disk, an optical disk, a magneto-optical disk, or a semiconductor memory, installed into the storage unit 1008, and loaded from the storage unit 1008 to the RAM 1003. The RAM 1003 also appropriately stores data and the like necessary for the CPU 1001 to execute various processing.

In the computer configured as described above, for example, the CPU 1001 loads a program stored in the storage unit 1008 into the RAM 1003 via the input/output interface 1005 and the bus 1004 and executes the program, whereby the above-described series of processing is performed.

The program executed by the computer (CPU 1001) can be provided by being recorded in the removable storage medium 1011 as a package medium or the like, for example. Furthermore, the program can be provided via a wired or wireless transmission medium such as a local area network, the Internet, and digital satellite broadcasting.

In the computer, the program can be installed into the storage unit 1008 via the input/output interface 1005 by attaching the removable storage medium 1011 to the drive 1010. Furthermore, the program can be received by the communication unit 1009 via a wired or wireless transmission medium and installed into the storage unit 1008. In addition, the program can be installed into the ROM 1002 or the storage unit 1008 in advance.

Note that the program executed by the computer may be a program in which processing is performed in time series along the order explained in the present description, or may be a program in which processing is performed in parallel or at a necessary timing such as when a call is made.

Note that the CPU 1001 in FIG. 11 implements the function of the control unit 31 of FIG. 1.

Furthermore, in the present description, the system means a set of a plurality of configuration elements (apparatuses, modules (components), and so on), and it does not matter whether or not all the configuration elements are in the same housing. Accordingly, a plurality of apparatuses housed in separate housings and connected via a network, and a single apparatus in which a plurality of modules is housed in a single housing are both systems.

Note that the embodiments of the present disclosure are not limited to the above-described embodiments, and various modifications can be made without departing from the gist of the present disclosure.

For example, the present disclosure can have a configuration of cloud computing in which one function is shared and processed in cooperation by a plurality of apparatuses via a network.

Furthermore, each step explained in the above-described flowcharts can be executed by one apparatus or executed by a plurality of apparatuses in a shared manner.

Moreover, in a case where one step includes a plurality of processing, the plurality of processing included in the one step can be executed by one apparatus or executed by a plurality of apparatuses in a shared manner.

Note that the present disclosure can also have the following configurations.

<1> An information processing system including
  a task processing unit that processes a recognized task on the basis of first information having higher relevance to the task than a predetermined standard and second information having lower relevance to the task than the predetermined standard.

<2> The information processing system according to <1>, in which
  the task processing unit processes the task on the basis of the first information, and further processes the task on the basis of the second information on the basis of evaluation of a processing result.

<3> The information processing system according to <2> further including
  an input data processing unit that supplies at least any of the first information and the second information to the task processing unit, in which
  in a case where evaluation of a processing result based on the first information by the task processing unit is lower than a predetermined threshold, the input data processing unit supplies the second information to the task processing unit.

<4> The information processing system according to <3>, in which
  the input data processing unit mixes and supplies, to the task processing unit, the first information and the second information at a predetermined mixing ratio, and
  in a case where evaluation of a processing result based on the first information and the second information mixed at the predetermined mixing ratio by the task processing unit is lower than a predetermined threshold, the input data processing unit mixes and supplies, to the task processing unit, the first information and the second information at a new mixing ratio in which a mixing ratio of the second information is increased.

<5> The information processing system according to <4> further including
  a bias value setting unit that sets and supplies, to the input data processing unit, a bias value indicating a mixing ratio of the first information and the second information to be supplied to the task processing unit on the basis of evaluation of the processing result, in which
  the input data processing unit mixes and supplies, to the task processing unit, the first information and the second information at a mixing ratio based on the bias value.

<6> The information processing system according to <5>, in which
  when evaluation of a processing result by the task processing unit is regarded to be lower than a predetermined threshold, the bias value setting unit sets the bias value such that a mixing ratio of the second information becomes high.

<7> The information processing system according to <6>, in which
  the second information includes a plurality of pieces of hierarchical information having a plurality of hierarchical structures according to a level of relevance to the task, and
  when evaluation of a processing result based on the first information by the task processing unit is regarded to be lower than a predetermined threshold, the bias value setting unit sets the bias value such that a mixing ratio of the second information including the hierarchy information having low relevance to the task becomes high.

<8> The information processing system according to <2>, in which
  the task processing unit further includes a main information storage unit that stores main information used when the task is processed,
  the main information storage unit stores the first information as the main information, and
  in a case where evaluation of a processing result based on the first information by the task processing unit is lower than a predetermined threshold, the main information storage unit is caused to store the second information as new main information in addition to the first information having been already stored.

<9> The information processing system according to <8> further including
  a bias value setting unit that sets a bias value indicating an information amount of the second information to be stored in the main information storage unit on the basis of evaluation of the processing result, in which
  the main information storage unit stores the second information by an information amount set on the basis of the bias value.

<10> The information processing system according to <9>, in which
  when evaluation of a processing result by the task processing unit is regarded to be lower than a predetermined threshold, the bias value setting unit sets the bias value such that an information amount of the second information to be stored in the main information storage unit increases.

<11> The information processing system according to <1>, in which
  the task processing unit processes the task on the basis of a processing pattern or a processing model having higher relevance to the task as the first information than a predetermined standard and a processing pattern or a processing model having lower relevance to the task as the second information than a predetermined standard.

<12> The information processing system according to <11>, in which
  the task processing unit processes the task on the basis of a processing pattern or a processing model having higher relevance to the task as first information related to the task than a predetermined standard, and further processes the task on the basis of a processing pattern or a processing model having lower relevance to the task as second information than a predetermined standard on the basis of evaluation of a processing result.

<13> The information processing system according to <12>, in which the task processing unit includes a supply processing unit that supplies at least any of a plurality of processing patterns or processing models having different relevance, and a task pattern model processing unit that processes the task on the basis of a processing pattern or a processing model supplied by the supply processing unit, the task pattern model processing unit processes the task on the basis of a processing pattern or a processing model having higher relevance to the task as the first information than a predetermined standard, and in a case where evaluation of a processing result based on a processing pattern or a processing model having higher relevance to the task by the task pattern model processing unit than a predetermined standard is lower than a predetermined threshold, the supply processing unit supplies a processing pattern or a processing model having lower relevance to the task as the second information than a predetermined standard.

<14> The information processing system according to <13>, in which in a case where evaluation of a processing result based on a processing pattern or a processing model having lower relevance to the task as second information by the task pattern model processing unit than a predetermined standard is lower than a predetermined threshold, the supply processing unit supplies, to the task pattern model processing unit, a new processing pattern or processing model having lower relevance to the task as the second information than another predetermined value lower than the predetermined standard.

<15> The information processing system according to <14> further including a bias value setting unit that sets and supplies, to the supply processing unit, a bias value indicating a level of relevance to the task corresponding to a processing pattern or a processing model to be supplied on the basis of evaluation of the processing result, in which the supply processing unit supplies, to the task pattern model processing unit, a processing pattern or a processing model having a level of relevance to the task corresponding to the bias value.

<16> The information processing system according to <15>, in which when evaluation of a processing result by the task pattern model processing unit is regarded to be lower than a predetermined threshold, the bias value setting unit sets the bias value so as to supply a processing pattern or a processing model having a level of relevance to the task.

<17> The information processing system according to any of <1> to <16> further including an output unit that outputs a processing result of the task processing unit.

<18> The information processing system according to <17>, in which the output unit outputs a processing result in which evaluation of the processing result is regarded to be higher than a threshold.

<19> An information processing method including a step of processing a recognized task on the basis of first information having higher relevance to the task than a predetermined standard and second information having lower relevance to the task than the predetermined standard.

<20> A program causing a computer to function as a task processing unit that processes a recognized task on the basis of first information having higher relevance to the task than a predetermined standard and second information having lower relevance to the task than the predetermined standard.

REFERENCE SIGNS LIST

11 Information processing apparatus
331 Control unit
32 Input unit
33 Output unit
34 Storage unit
35 Communication unit
36 Drive
37 Removable storage medium
52 Task processing unit
71 Task input unit
72 Task processing module
73 Processing result evaluation module
74 Output unit
75 Bias value setting unit
76 Input data processing unit
77 Storage module
91 First data group
92 Second data group
101 Bias value setting unit
102 Input data processing unit
103 Storage module
111 to n First data group to n-th data group
171 Task input unit
172 Task processing module
173 Processing result evaluation module
174 Output unit
175 Bias value setting unit
176 Input data processing unit
177 Main storage module
178 First sub storage module
179 Second sub storage module
191 First data group
192 Second data group
371 Task input unit
372 Task processing module
373 Processing result evaluation module
374 Output unit
375 Bias value setting unit
376 Storage module
381 First task processing module
382 Second task processing module

The invention claimed is:

1. An information processing system, comprising:
processing circuitry configured to
perform a recognized task using first information, from a first data group, having higher relevance to performing the task than a predetermined standard,
calculate an evaluation value of a processing result obtained from performing the task using the first information,
in response to determining that the calculated evaluation value is lower than a predetermined threshold, obtain second information, from a second data group and different from the first information, having lower relevance to the task than the predetermined standard, and perform the task again using the first information and the second information mixed at a predetermined mixing ratio.

2. The information processing system according to claim 1, wherein in response to determining that a newly calculated evaluation value of a new processing result obtained from performing the task using the first information and the second information mixed at the predetermined mixing ratio is lower than the predetermined threshold, mix and obtain the first information and the second information at a new mixing ratio in which a mixing ratio of the second information is increased.

3. The information processing system according to claim 2, wherein the processing circuitry is further configured to:

set a bias value indicating a mixing ratio of the first information and the second information based on the newly calculated evaluation value, and mix and obtain the first information and the second information at the new mixing ratio, which is based on the set bias value.

4. The information processing system according to claim 3, wherein when the newly calculated evaluation value of the new processing result by the processing circuitry is determined to be lower than the predetermined threshold, the processing circuitry is further configured to set the bias value such that the new mixing ratio of the second information becomes higher.

5. The information processing system according to claim 4, wherein the second information includes a plurality of pieces of hierarchical information having a plurality of hierarchical structures according to a level of relevance to the task, and when the evaluation value of the processing result based on the first information by the processing circuitry is determined to be lower than the predetermined threshold, the processing circuitry is further configured to set the bias value such that the mixing ratio of the second information including the hierarchy information having low relevance to the task becomes higher.

6. The information processing system according to claim 1, further comprising a main information memory that stores main information used when the task is processed, wherein the main memory stores the first information as the main information, and in response to determining that the evaluation value of the processing result based on the first information is lower than the predetermined threshold, the main information memory is caused to store the second information as new main information in addition to the first information having been already stored.

7. The information processing system according to claim 6, wherein the processing circuitry is further configured to set a bias value indicating an information amount of the second information to be stored in the main information memory based on the evaluation value of the processing result, and the main information memory stores the second information by an information amount set based on the set bias value.

8. The information processing system according to claim 7, wherein when the evaluation value of the processing result by the processing circuitry is determined to be lower than the predetermined threshold, the processing circuitry is further configured to set the bias value such that an information amount of the second information to be stored in the main information memory increases.

9. The information processing system according to claim 1, wherein the processing circuitry is further configured to process the task based on a processing pattern or a processing model having higher relevance to the task than the predetermined standard as the first information and a processing pattern or a processing model having lower relevance to the task than a predetermined standard as the second information.

10. The information processing system according to claim 9, wherein the processing circuitry is further configured to process the task based on the processing pattern or the processing model having higher relevance to the task than the predetermined standard as the first information, and process the task based on the processing pattern or the processing model having lower relevance to the task than the predetermined standard as the second information, based on the evaluation value of the processing result.

11. The information processing system according to claim 10, wherein the processing circuitry is further configured to:

supply at least any of a plurality of processing patterns or processing models having different relevance, process the task based on a supplied processing pattern or a supplied processing model, process the task based on the processing pattern or the processing model having higher relevance to the task information than a predetermined standard as the first information, and in response to determining that the evaluation value of the processing result based on the processing pattern or the processing model having higher relevance to the task than the predetermined standard is lower than the predetermined threshold, the supply the processing pattern or the processing model having lower relevance to the task than the predetermined standard as the second information.

12. The information processing system according to claim 11, wherein in response to determining that the evaluation value of the processing result based on the processing pattern or the processing model having lower relevance to the task than a predetermined standard as the first information is lower than the predetermined threshold, obtain a new processing pattern or processing model having lower relevance to the task than another predetermined value lower than the predetermined standard as the second information.

13. The information processing system according to claim 12, wherein the processing circuitry is further configured to:

set a bias value indicating a level of relevance to the task corresponding to the processing pattern or the processing model based on the evaluation value of the processing result, and obtain the processing pattern or the processing model having a level of relevance to the task corresponding to the set bias value.

14. The information processing system according to claim 13, wherein when the evaluation value of the processing result determined to be lower than the predetermined threshold, the processing circuitry is further configured to set the bias value so as to obtain the processing pattern or the processing model having a level of relevance to the task.

15. The information processing system according to claim 1, wherein the processing circuitry is further configured to output the processing result.

16. The information processing system according to claim 15, wherein the processing circuitry is further configured to output the processing result, in which the evaluation value of the processing result is higher than the predetermined threshold.

17. An information processing method, comprising:
- performing a recognized task using first information, from a first data group, having higher relevance to performing the task than a predetermined standard,
- calculating an evaluation value of a processing result obtained from performing the task using the first information,
- in response to determining that the calculated evaluation value is lower than a predetermined threshold, obtaining second information, from a second data group and different from the first information, having lower relevance to the task than the predetermined standard, and
- performing the task again using the first information and the second information mixed at a predetermined mixing ratio.

18. A non-transitory computer-readable medium storing a program that when executed by processing circuitry, causes the processing circuitry to perform a method comprising:
- performing a recognized task using first information, from a first data group, having higher relevance to performing the task than a predetermined standard,
- calculating an evaluation value of a processing result obtained from performing the task using the first information,
- in response to determining that the calculated evaluation value is lower than a predetermined threshold, obtaining second information, from a second data group and different from the first information, having lower relevance to the task than the predetermined standard, and
- performing the task again using the first information and the second information mixed at a predetermined mixing ratio.

\* \* \* \* \*